(12) United States Patent
Sugihara

(10) Patent No.: US 11,461,889 B2
(45) Date of Patent: Oct. 4, 2022

(54) PATTERN INSPECTION APPARATUS AND PATTERN INSPECTION METHOD

(71) Applicant: NuFlare Technology, Inc., Yokohama (JP)

(72) Inventor: Shinji Sugihara, Ota-ku (JP)

(73) Assignee: NuFlare Technology, Inc., Yokohama (JP)

( * ) Notice: Subject to any disclaimer, the term of this patent is extended or adjusted under 35 U.S.C. 154(b) by 197 days.

(21) Appl. No.: 17/023,537

(22) Filed: Sep. 17, 2020

(65) Prior Publication Data
US 2021/0142457 A1 May 13, 2021

(30) Foreign Application Priority Data

Nov. 12, 2019 (JP) .............................. JP2019-204960

(51) Int. Cl.
*G06T 7/00* (2017.01)
*G01N 23/2251* (2018.01)
(Continued)

(52) U.S. Cl.
CPC .......... *G06T 7/001* (2013.01); *G01N 21/9501* (2013.01); *G01N 21/956* (2013.01);
(Continued)

(58) Field of Classification Search
CPC ............. G01N 21/9501; G01N 21/956; G01N 23/2251; G01N 2223/401;
(Continued)

(56) References Cited

U.S. PATENT DOCUMENTS

| 6,292,583 B1 | 9/2001 | Maruo |
| 2003/0118248 A1 | 6/2003 | Kyong |

(Continued)

FOREIGN PATENT DOCUMENTS

| JP | 11-110561 A | 4/1999 |
| JP | 3786910 B2 | 6/2006 |

(Continued)

OTHER PUBLICATIONS

Canny, J., "A Computational Approach to Edge Detection," IEEE Transactions on Pattern Analysis and Machine Intelligence, vol. PAMI-8, No. 6, Nov. 1986, 20 pages.

*Primary Examiner* — Emily C Terrell
*Assistant Examiner* — Ahmed A Nasher
(74) *Attorney, Agent, or Firm* — Oblon, McClelland, Maier & Neustadt, L.L.P.

(57) ABSTRACT

According to one aspect of the present invention, a pattern inspection apparatus includes: a profile extraction circuit configured to extract each of a plurality of predetermined dimensional profiles for a plurality of pixels with a value of a differential intensity greater than or equal to a threshold value in the image; a wavelet transform circuit configured to perform, on each of the plurality of predetermined dimensional profiles, a wavelet transform while changing a scale variable of a mother wavelet function to a predetermined value; and a contour position extraction circuit configured to extract, for the each of the plurality of predetermined dimensional profiles, a maximum peak position as a contour position of the figure pattern from peak positions of a plurality of transformed profiles of after the wavelet transform in which the scale variable is set.

12 Claims, 16 Drawing Sheets

(51) Int. Cl.
*G01N 21/956* (2006.01)
*G01N 21/95* (2006.01)
*G06T 7/13* (2017.01)
*G06T 7/73* (2017.01)

(52) U.S. Cl.
CPC .......... *G01N 23/2251* (2013.01); *G06T 7/13* (2017.01); *G06T 7/73* (2017.01); *G01N 2223/401* (2013.01); *G01N 2223/6116* (2013.01); *G06T 2207/20064* (2013.01); *G06T 2207/30148* (2013.01)

(58) Field of Classification Search
CPC ... G01N 2223/6116; G06T 7/001; G06T 7/13; G06T 7/73; G06T 2207/20064; G06T 2207/30148; G06T 7/12; G06T 7/136; G06T 7/168; H01L 22/10
See application file for complete search history.

(56) References Cited

U.S. PATENT DOCUMENTS

| | | | |
|---|---|---|---|
| 2018/0232873 A1* | 8/2018 | Inoue | G06T 7/001 |
| 2018/0261424 A1 | 9/2018 | Tsuchiya | |
| 2019/0164303 A1* | 5/2019 | Mack | G06T 7/40 |

FOREIGN PATENT DOCUMENTS

| | | |
|---|---|---|
| JP | 2014-182117 A | 9/2014 |
| JP | 2018-151202 A | 9/2018 |

* cited by examiner

Profile Calculation by Interpolation

Peak Position Calculation Result

PATTERN INSPECTION APPARATUS AND PATTERN INSPECTION METHOD

CROSS-REFERENCE TO RELATED APPLICATION

This application is based upon and claims the benefit of priority from prior Japanese Patent Application No. 2019-204960 filed on Nov. 12, 2019 in Japan, the entire contents of which are incorporated herein by reference.

BACKGROUND OF THE INVENTION

Field of the Invention

Embodiments of the present invention relate to a pattern inspection apparatus and a pattern inspection method. For example, embodiments of the present invention relate to an inspection apparatus that performs inspection using a secondary electron image of a pattern emitted from the substrate irradiated with multiple electron beams, an inspection apparatus that performs inspection using an optical image of a pattern acquired from the substrate irradiated with ultraviolet rays, and inspection methods thereof.

Description of Related Art

With recent progress in high integration and large capacity of the LSI (Large Scale Integrated circuits), the line width (critical dimension) required for circuits of semiconductor elements is becoming increasingly narrower. Since LSI manufacturing requires an enormous production cost, it is essential to improve the yield. Meanwhile, as the scale of patterns that make up LSI has reached the order of 10 nanometers or less, dimensions to be detected as a pattern defect have become extremely small. Therefore, the pattern inspection apparatus for inspecting defects of ultrafine patterns exposed/transferred onto a semiconductor wafer needs to be highly accurate. Further, one of major factors that decrease the yield of the LSI manufacturing is due to pattern defects on a mask for exposing/transferring an ultrafine pattern onto the semiconductor wafer by the photolithography technology. Therefore, the pattern inspection apparatus for inspecting defects on an exposure transfer mask used in manufacturing LSI also needs to be highly accurate.

As a defect inspection method, there is known a method of comparing a measured image acquired by imaging a pattern formed on a substrate, such as a semiconductor wafer or a lithography mask, with design data or with another measured image acquired by imaging the same pattern on the substrate. For example, as a pattern inspection method, there is "die-to-die inspection" or "die-to-database inspection". The "die-to-die inspection" method compares data of measured images acquired by imaging the same patterns at different positions on the same substrate. The "die-to-database inspection" method generates, based on pattern design data, design image data (reference image), and compares it with a measured image being measured data acquired by imaging a pattern. Acquired images are transmitted as measured data to a comparison circuit. After performing alignment between the images, the comparison circuit compares the measured data with reference data according to an appropriate algorithm, and determines that there is a pattern defect if the compared data do not match each other.

Specifically with respect to the pattern inspection apparatus described above, in addition to the type of apparatus that irradiates an inspection substrate with laser beams in order to obtain a transmission image or a reflection image of a pattern formed on the substrate, another type of inspection apparatus has been developed that acquires a pattern image by scanning the inspection substrate with primary electron beams and detecting secondary electrons emitted from the inspection substrate by the irradiation with the primary electron beams. Regarding the pattern inspection apparatus, it has been examined, instead of comparing pixel values, to extract (obtain) the contour line of a pattern in an image, and use the distance between the obtained contour line and the contour line of a reference image, as a determining index, to highly accurately detect the position of a pattern edge (e.g., refer to Japanese Patent Application Laid-open (JP-A) No. 2018-151202). However, since the template and edge filter for use in obtaining pattern edges are fixed, and layout data is needed to extract the pattern edges, if a profile change occurs due to an image change and the like resulting from noise, charging, focus deviation, and so on, a problem arises in that an error (deviation) is generated at the edge position.

A technique is disclosed that generates a binary image after performing a wavelet transform on an SEM image, and applies a Hough transform to the binary image in order to obtain the position and size of a detection target (e.g., refer to Japanese Patent Application Laid-open (JP-A) No. 11-110561).

BRIEF SUMMARY OF THE INVENTION

According to one aspect of the present invention, a pattern inspection apparatus includes:

an image acquisition mechanism configured to acquire an image of a substrate on which a figure pattern has been formed;

a differential intensity calculation circuit configured to calculate, for each pixel of the image, a differential intensity of a gray scale value of the each pixel;

a profile extraction circuit configured to extract a plurality of predetermined dimensional profiles for a plurality of pixels with a value of the differential intensity greater than or equal to a threshold value in the image, each of the plurality of predetermined dimensional profiles being extracted for each pixel of the plurality of pixels and being a predetermined dimensional profile of a plurality of pixels including a pixel with the value of the differential intensity greater than or equal to the threshold value in a predetermined direction with respect to the differential intensity of the pixel with the value of the differential intensity;

a wavelet transform circuit configured to perform, on each of the plurality of predetermined dimensional profiles, a wavelet transform while changing a scale variable of a mother wavelet function to a predetermined value;

a contour position extraction circuit configured to extract, for the each of the plurality of predetermined dimensional profiles, a maximum peak position as a contour position of the figure pattern from peak positions of a plurality of transformed profiles of after the wavelet transform in which the scale variable is set; and a comparison circuit configured to compare a contour line of the figure pattern of the image made by connecting a plurality of extracted contour positions with a reference contour line of a figure pattern in a region corresponding to the image.

According to another aspect of the present invention, a pattern inspection apparatus includes:

an image acquisition mechanism configured to acquire an image of a substrate on which a figure pattern has been formed;

a differential intensity calculation circuit configured to calculate, for each pixel of the image, a differential intensity of a gray scale value of the each pixel;

a profile extraction circuit configured to extract a plurality of predetermined dimensional profiles for a plurality of pixels with a value of the differential intensity greater than or equal to a threshold value in the image, each of the plurality of predetermined dimensional profiles being extracted for each pixel of the plurality of pixels and being a predetermined dimensional profile of a plurality of pixels including a pixel with the value of the differential intensity greater than or equal to the threshold value in a predetermined direction with respect to the differential intensity of the pixel with the value of the differential intensity;

a wavelet transform circuit configured to perform, on each of the plurality of predetermined dimensional profiles, a wavelet transform using a plurality of mother wavelet functions;

a contour position extraction circuit configured to extract, for the each of the plurality of predetermined dimensional profiles, a maximum peak position as a contour position of the figure pattern from peak positions of a plurality of transformed profiles of after the wavelet transform using the plurality of mother wavelet functions, each of the plurality of mother wavelet functions being used for a wavelet transform of a different one of the plurality of transformed profiles; and a comparison circuit configured to compare a contour line of the figure pattern of the image made by connecting a plurality of extracted contour positions with a reference contour line of a figure pattern in a region corresponding to the image.

According to yet another aspect of the present invention, a pattern inspection method includes:

acquiring an image of a substrate on which a figure pattern has been formed;

calculating, for each pixel of the image, a differential intensity of a gray scale value of the each pixel;

extracting a plurality of predetermined dimensional profiles for a plurality of pixels with a value of the differential intensity greater than or equal to a threshold value in the image, each of the plurality of predetermined dimensional profiles being extracted for each pixel of the plurality of pixels and being a predetermined dimensional profile of a plurality of pixels including a pixel with the value of the differential intensity greater than or equal to the threshold value in a predetermined direction with respect to the differential intensity of the pixel with the value of the differential intensity;

performing, on each of the plurality of predetermined dimensional profiles, a wavelet transform while changing a scale variable of a mother wavelet function to a predetermined value;

extracting, for the each of the plurality of predetermined dimensional profiles, a maximum peak position as a contour position of the figure pattern from peak positions of the plurality of transformed profiles of after the wavelet transform in which the scale variable is set; and comparing a contour line of the figure pattern of the image made by connecting a plurality of extracted contour positions with a reference contour line of a figure pattern in a region corresponding to the image, and outputting a comparison result.

According to yet another aspect of the present invention, a pattern inspection method includes:

acquiring an image of a substrate on which a figure pattern has been formed;

calculating, for each pixel of the image, a differential intensity of a gray scale value of the each pixel;

extracting a plurality of predetermined dimensional profiles for a plurality of pixels with a value of the differential intensity greater than or equal to a threshold value in the image, each of the plurality of predetermined dimensional profiles being extracted for each pixel of the plurality of pixels and being a predetermined dimensional profile of a plurality of pixels including a pixel with the value of the differential intensity greater than or equal to the threshold value in a predetermined direction with respect to the differential intensity of the pixel with the value of the differential intensity;

performing, on each of the plurality of predetermined dimensional profiles, a wavelet transform using a plurality of mother wavelet functions;

extracting, for the each of the plurality of predetermined dimensional profiles, a maximum peak position as a contour position of the figure pattern from peak positions of the plurality of transformed profiles of after the wavelet transform using the plurality of mother wavelet functions, each of the plurality of mother wavelet functions being used for a wavelet transform of a different one of the plurality of transformed profiles; and comparing a contour line of the figure pattern of the image made by connecting a plurality of extracted contour positions with a reference contour line of a figure pattern in a region corresponding to the image, and outputting a comparison result.

DETAILED DESCRIPTION OF THE INVENTION

The embodiments below describe an inspection apparatus and method that can reduce an error (deviation) at a pattern edge position detected from an image even when a profile change occurs due to an image change, and the like.

Moreover, the embodiments below describe an electron beam inspection apparatus as an example of a pattern inspection apparatus, but it is not limited thereto. For example, the inspection apparatus may be the one in which the inspection substrate is irradiated with ultraviolet rays in order to obtain an inspection image by using a light transmitted through the inspection substrate or reflected therefrom. Further, the embodiments below describe an inspection apparatus using multiple electron beams in order to acquire an image, but it is not limited thereto. The inspection apparatus using a single electron beam to acquire an image may also be employed.

First Embodiment

Figure 1:
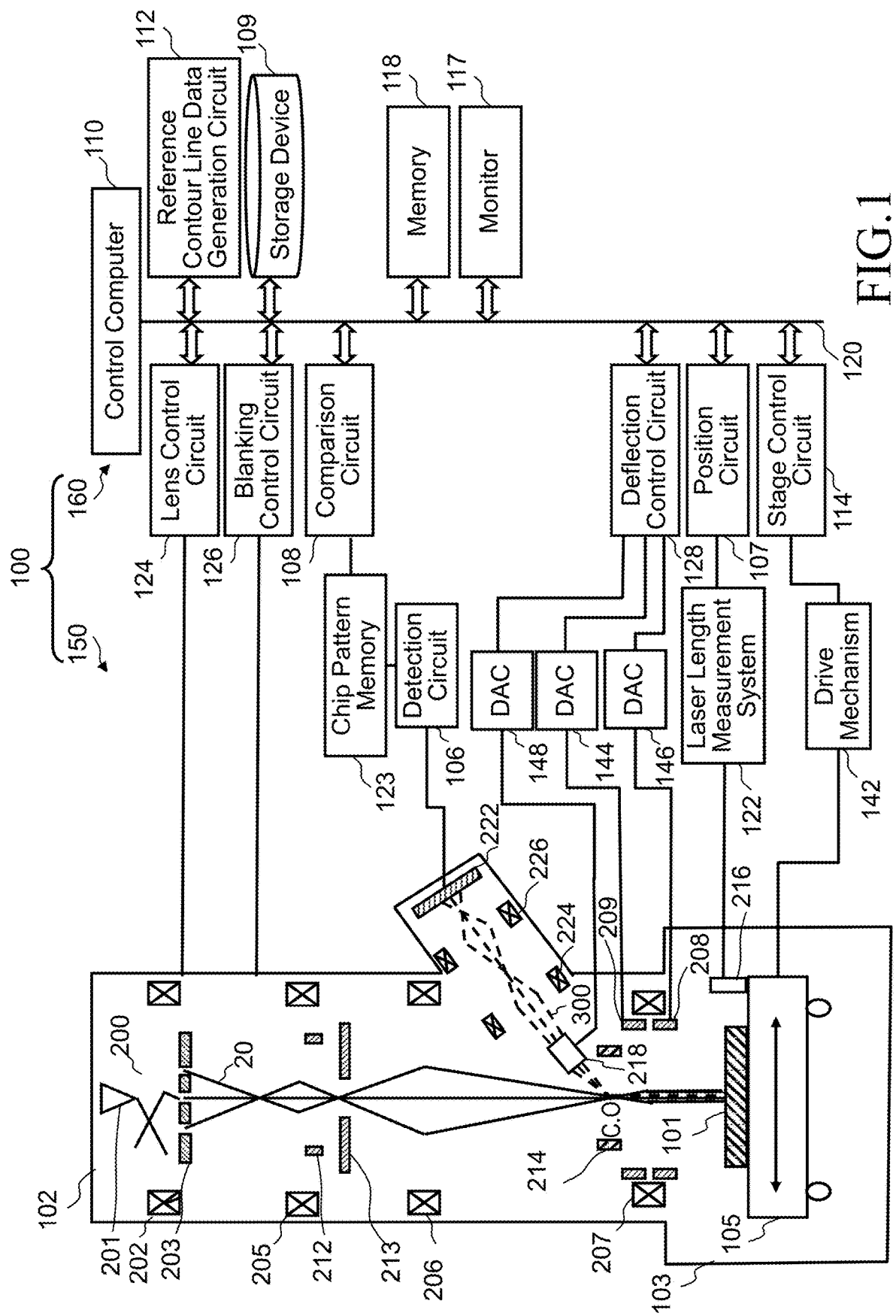
FIG. 1 shows an example of a configuration of a pattern inspection apparatus according to a first embodiment.

FIG. 1 shows an example of a configuration of a pattern inspection apparatus according to a first embodiment. In FIG. 1, an inspection apparatus 100 for inspecting a pattern formed on the substrate is an example of a multi electron beam inspection apparatus. The inspection apparatus 100 includes an image acquisition mechanism 150 (secondary electron image acquisition mechanism) and a control system circuit 160. The image acquisition mechanism 150 includes an electron beam column 102 (electron optical column) and an inspection chamber 103. In the electron beam column 102, there are disposed an electron gun 201, an electromagnetic lens 202, a shaping aperture array substrate 203, an electromagnetic lens 205, a common blanking deflector 212, a limiting aperture substrate 213, an electromagnetic lens 206, an electromagnetic lens 207 (objective lens), a main deflector 208, a sub deflector 209, abeam separator 214, a deflector 218, an electromagnetic lens 224, an electromagnetic lens 226, and a multi-detector 222. In the case of FIG. 1, a primary electron optical system that irradiates a substrate 101 with multiple primary electron beams is composed of the electron gun 201, the electromagnetic lens 202, the shaping aperture array substrate 203, the electromagnetic lens 205, the common blanking deflector 212, the limiting aperture substrate 213, the electromagnetic lens 206, the electromagnetic lens 207 (objective lens), the main deflector 208, and the sub deflector 209. A secondary electron optical system that irradiates the multi-detector 222 with multiple secondary electron beams is composed of the beam separator 214, the deflector 218, the electromagnetic lens 224, and the electromagnetic lens 226.

In the inspection chamber 103, there is disposed a stage 105 movable at least in the x and y directions. The substrate 101 (target object) to be inspected is mounted on the stage 105. The substrate 101 may be an exposure mask substrate, or a semiconductor substrate such as a silicon wafer. In the case of the substrate 101 being a semiconductor substrate, a plurality of chip patterns (wafer dies) are formed on the semiconductor substrate. In the case of the substrate 101 being an exposure mask substrate, a chip pattern is formed on the exposure mask substrate. The chip pattern is composed of a plurality of figure patterns. When the chip pattern formed on the exposure mask substrate is exposed/transferred onto the semiconductor substrate a plurality of times, a plurality of chip patterns (wafer dies) are formed on the semiconductor substrate. The case of the substrate 101 being a semiconductor substrate is described below mainly. The substrate 101 is placed with its pattern-forming surface facing upward on the stage 105, for example. Moreover, on the stage 105, there is disposed a mirror 216 which reflects a laser beam for measuring a laser length emitted from a laser length measuring system 122 arranged outside the inspection chamber 103. The multi-detector 222 is connected, at the outside of the electron beam column 102, to a detection circuit 106.

In the control system circuit 160, a control computer 110 which controls the whole of the inspection apparatus 100 is connected, through a bus 120, to a position circuit 107, a comparison circuit 108, a reference contour line data generation circuit 112, a stage control circuit 114, a lens control circuit 124, a blanking control circuit 126, a deflection control circuit 128, a storage device 109 such as a magnetic disk drive, a monitor 117, and a memory 118. The deflection control circuit 128 is connected to DAC (digital-to-analog conversion) amplifiers 144, 146 and 148. The DAC amplifier 146 is connected to the main deflector 208, and the DAC amplifier 144 is connected to the sub deflector 209. The DAC amplifier 148 is connected to the deflector 218.

The detection circuit 106 is connected to a chip pattern memory 123 which is connected to the comparison circuit 108. The stage 105 is driven by a drive mechanism 142 under the control of the stage control circuit 114. In the drive mechanism 142, a drive system such as a three (x-, y-, and θ-) axis motor which provides drive in the directions of x, y, and θ in the stage coordinate system is configured, and the stage 105 can move in the x, y, and θ directions. A step motor, for example, can be used as each of these x, y, and θ motors (not shown). The stage 105 is movable in the horizontal direction and the rotation direction by the x-, y-, and θ-axis motors. The movement position of the stage 105 is measured by the laser length measuring system 122, and supplied (transmitted) to the position circuit 107. Based on the principle of laser interferometry, the laser length measuring system 122 measures the position of the stage 105 by receiving a reflected light from the mirror 216. In the stage coordinate system, the x, y, and θ directions are set with respect to a plane perpendicular to the optical axis (center axis of electron trajectory) of the multiple primary electron beams, for example.

The electromagnetic lenses 202, 205, 206, 207 (objective lens), 224 and 226, and the beam separator 214 are controlled by the lens control circuit 124. The common blanking deflector 212 is configured by two or more electrodes (or "two or more poles"), and each electrode is controlled by the blanking control circuit 126 through a DAC amplifier (not shown). The sub deflector 209 is configured by four or more electrodes (or "four or more poles"), and each electrode is controlled by the deflection control circuit 128 through the DAC amplifier 144. The main deflector 208 is configured by four or more electrodes (or "four or more poles"), and each electrode is controlled by the deflection control circuit 128 through the DAC amplifier 146. The deflector 218 is configured by four or more electrodes (or "four or more poles"), and each electrode is controlled by the deflection control circuit 128 through the DAC amplifier 148.

To the electron gun 201, there is connected a high voltage power supply circuit (not shown). The high voltage power supply circuit applies an acceleration voltage between a filament (cathode) and an extraction electrode (anode) (which are not shown) in the electron gun 201. In addition to the applying the acceleration voltage, a voltage is applied to another extraction electrode (Wehnelt), and the cathode is heated to a predetermined temperature, and thereby, electrons from the cathode are accelerated to be emitted as an electron beam 200.

FIG. 1 shows configuration elements necessary for describing the first embodiment. It should be understood that other configuration elements generally necessary for the inspection apparatus 100 may also be included therein.

Figure 2:
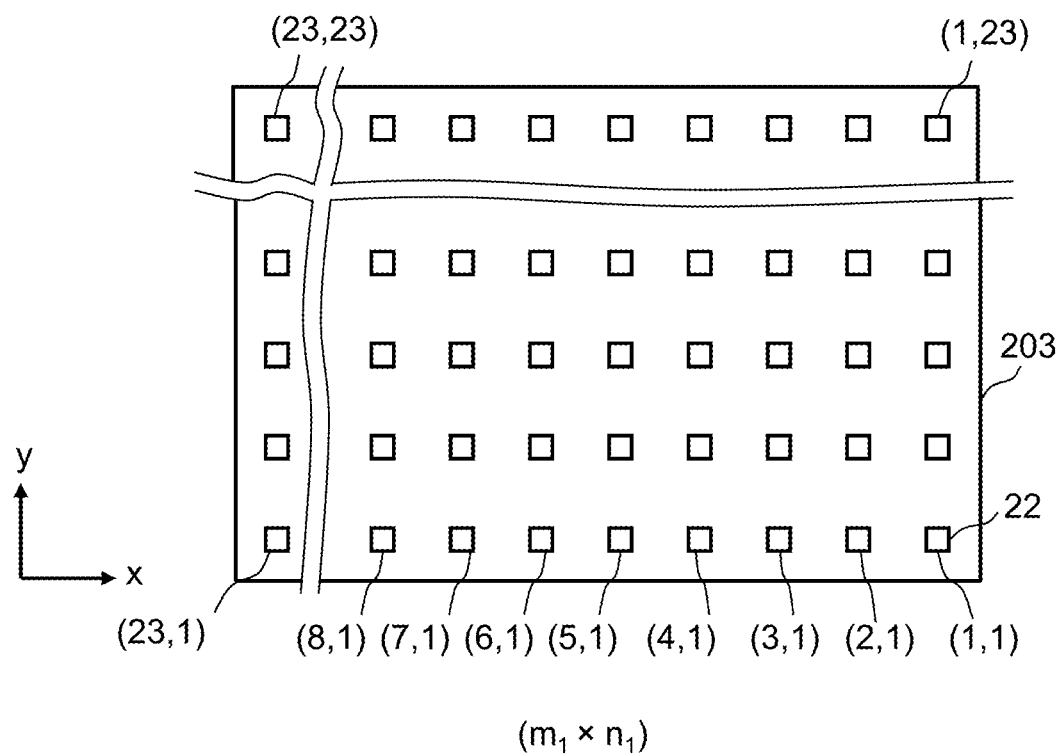
FIG. 2 is a conceptual diagram showing a configuration of a shaping aperture array substrate according to the first embodiment.

FIG. 2 is a conceptual diagram showing a configuration of a shaping aperture array substrate according to the first embodiment. As shown in FIG. 2, holes (openings) 22 of $m_1$ columns wide (width in the x direction) (each column in the y direction) and $n_1$ rows long (length in the y direction) (each row in the x direction) are two-dimensionally formed at a predetermined arrangement pitch in the shaping aperture array substrate 203, where one of $m_1$ and $n_1$ is an integer of 2 or more, and the other is an integer of 1 or more. In the case of FIG. 2, 23×23 holes (openings) 22 are formed. Ideally, each of the holes 22 is a rectangle (including a square) having the same dimension, shape, and size. Alternatively, ideally, each of the holes 22 may be a circle with the same outer diameter. $m_1 \times n_1$ (=N) multiple primary electron beams 20 are formed by letting portions of the electron beam 200 individually pass through a corresponding one of a plurality of holes 22.

Next, operations of the image acquisition mechanism 150 in the inspection apparatus 100 will be described below.

The electron beam 200 emitted from the electron gun 201 (emission source) is refracted by the electromagnetic lens 202, and illuminates the whole of the shaping aperture array substrate 203. As shown in FIG. 2, a plurality of holes 22 (openings) are formed in the shaping aperture array substrate 203. The region including all the plurality of holes 22 is irradiated by the electron beam 200. The multiple primary electron beams 20 are formed by letting portions of the electron beam 200, which irradiate the positions of a plurality of holes 22, individually pass through a corresponding one of the plurality of holes 22 in the shaping aperture array substrate 203.

The formed multiple primary electron beams 20 are individually refracted by the electromagnetic lenses 205 and 206, and travel to the electromagnetic lens 207 (objective lens) while repeating forming an intermediate image and a crossover through the beam separator 214 disposed at the crossover position of each beam (at the intermediate image position of each beam) of the multiple primary electron beams 20. Then, the electromagnetic lens 207 focuses the multiple primary electron beams 20 onto the substrate 101. The multiple primary electron beams 20 having been focused on the substrate 101 (target object) by the electromagnetic lens 207 (objective lens) are collectively deflected by the main deflector 208 and the sub deflector 209 to irradiate respective beam irradiation positions on the substrate 101. When all of the multiple primary electron beams 20 are collectively deflected by the common blanking deflector 212, they deviate from the hole in the center of the limiting aperture substrate 213 and blocked by the limiting aperture substrate 213. On the other hand, the multiple primary electron beams 20 which were not deflected by the common blanking deflector 212 pass through the hole in the center of the limiting aperture substrate 213 as shown in FIG. 1. Blanking control is provided by On/Off of the common blanking deflector 212 to collectively control On/Off of the multiple beams. Thus, the limiting aperture substrate 213 blocks the multiple primary electron beams 20 which were deflected to be in the "Off condition" by the common blanking deflector 212. Then, the multiple primary electron beams 20 for inspection (for image acquisition) are formed by the beams having been made during a period from becoming "beam On" to becoming "beam Off" and having passed through the limiting aperture substrate 213.

When desired positions on the substrate 101 are irradiated with the multiple primary electron beams 20, a flux of secondary electrons (multiple secondary electron beams 300) including reflected electrons each corresponding to each of the multiple primary electron beams 20 is emitted from the substrate 101 by the irradiation with the multiple primary electron beams 20.

The multiple secondary electron beams 300 emitted from the substrate 101 travel to the beam separator 214 through the electromagnetic lens 207.

The beam separator 214 generates an electric field and a magnetic field to be perpendicular to each other in a plane perpendicular to the traveling direction (electron orbit central axis) of the center beam of the multiple primary electron beams 20. The electric field affects (exerts a force) in the same fixed direction regardless of the traveling direction of electrons. In contrast, the magnetic field affects (exerts a force) according to Fleming's left-hand rule. Therefore, the direction of force acting on (applied to) electrons can be changed depending on the traveling (or "entering") direction of the electrons. With respect to the multiple primary electron beams 20 entering the beam separator 214 from the upper side, since the force due to the electric field and the force due to the magnetic field cancel each other out, the multiple primary electron beams 20 travel straight downward. In contrast, with respect to the multiple secondary electron beams 300 entering the beam separator 214 from the lower side, since both the force due to the electric field and the force due to the magnetic field are exerted in the same direction, the multiple secondary electron beams 300 are bent obliquely upward, and separated from the multiple primary electron beams 20.

The multiple secondary electron beams 300 having been bent obliquely upward and separated from the multiple primary electron beams 20 are further bent by the deflector 218, and projected, while being refracted, onto the multi-detector 222 by the electromagnetic lenses 224 and 226. The multi-detector 222 detects the projected multiple secondary electron beams 300. It is acceptable that reflected electrons and secondary electrons are projected on the multi-detector 222, or that reflected electrons are emitted along the way and remaining secondary electrons are projected. The multi-detector 222 includes a two-dimensional sensor. Each secondary electron of the multiple secondary electron beams 300 collides with a corresponding region of the two-dimensional sensor so as to generate an electron, and secondary electron image data for each pixel. In other words, in the multi-detector 222, a detection sensor is disposed for each primary electron beam of the multiple primary electron beams 20. Then, the detection sensor detects a corresponding secondary electron beam emitted by irradiation with each primary electron beam. Therefore, each of a plurality of detection sensors in the multi-detector 222 detects an intensity signal of a secondary electron beam for an image resulting from the irradiation with a corresponding primary electron beam. The intensity signal detected by the multi-detector 222 is output to the detection circuit 106.

Figure 3:
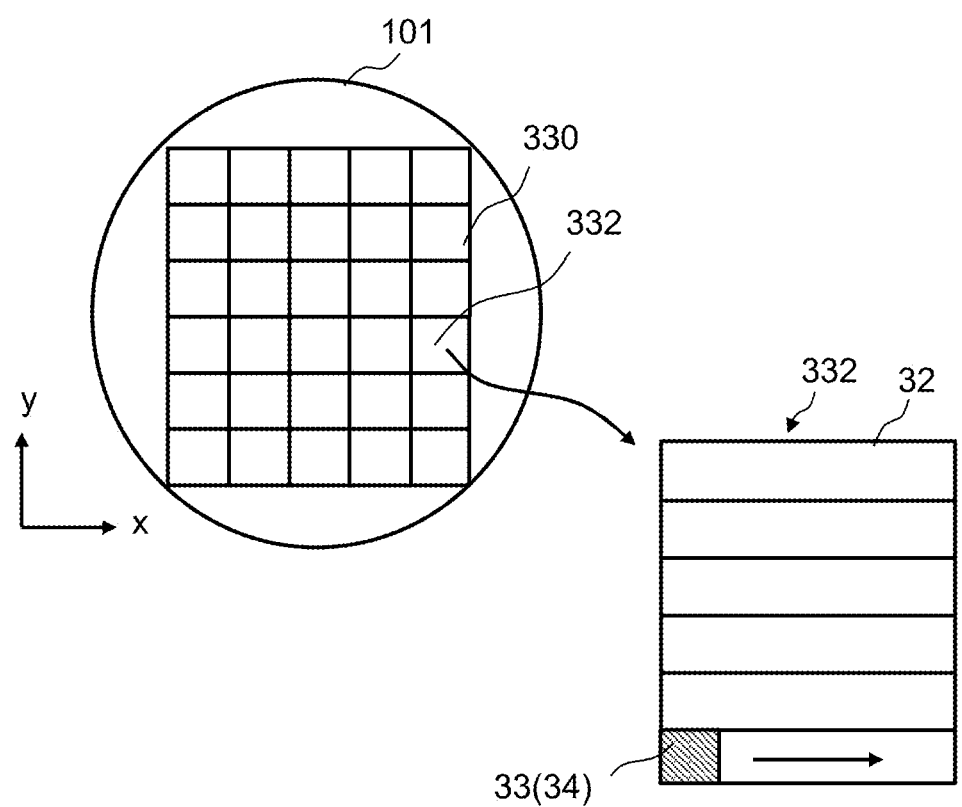
FIG. 3 shows an example of a plurality of chip regions formed on a semiconductor substrate, according to the first embodiment.

FIG. 3 shows an example of a plurality of chip regions formed on a semiconductor substrate, according to the first embodiment. In FIG. 3, in the case of the substrate 101 being a semiconductor substrate (wafer), a plurality of chips (wafer dies) 332 in a two-dimensional array are formed in an inspection region 330 of the semiconductor substrate (wafer). A mask pattern for one chip formed on an exposure mask substrate is reduced to ¼, for example, and exposed/transferred onto each chip 332 by an exposure device, such as a stepper and a scanner, (not shown). The region of each chip 332 is divided in the y direction, for example, into a plurality of stripe regions 32 by a predetermined width. The scanning operation by the image acquisition mechanism 150 is carried out for each stripe region 32, for example. The operation of scanning the stripe region 32 advances relatively in the x direction while the stage 105 is moved in the −x direction, for example. Each stripe region 32 is divided in the longitudinal direction into a plurality of rectangular (including square) regions 33. Beam application to a target rectangular region 33 is achieved by collectively deflecting all the multiple primary electron beams 20 by the main deflector 208.

Figure 4:
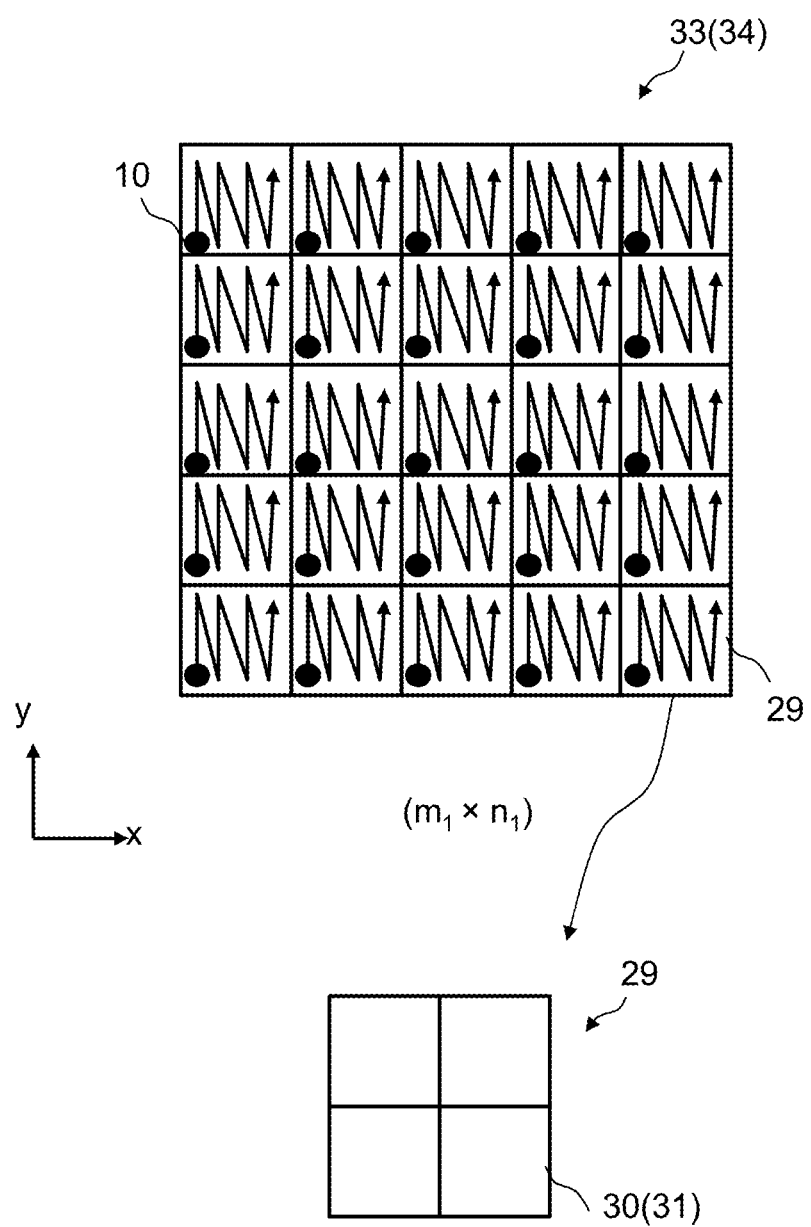
FIG. 4 illustrates a scanning operation with multiple beams according to the first embodiment.

FIG. 4 illustrates a scanning operation with multiple beams according to the first embodiment. FIG. 4 shows the case of multiple primary electron beams 20 of 5 rows×5 columns. The size of an irradiation region 34 which can be irradiated by one irradiation with the multiple primary electron beams 20 is defined by (x direction size obtained by multiplying a beam pitch in the x direction of the multiple primary electron beams 20 on the substrate 101 by the number of beams in the x direction)×(y direction size obtained by multiplying a beam pitch in the y direction of the multiple primary electron beams 20 on the substrate 101 by the number of beams in the y direction). Preferably, the width of each stripe region 32 is set to be the same as the size in the y direction of the irradiation region 34, or to be the size reduced by the width of the scanning margin. In the case of FIGS. 3 and 4, the irradiation region 34 and the rectangular region 33 are of the same size. However, it is not limited thereto. The irradiation region 34 may be smaller than the rectangular region 33, or larger than it. Each beam of the multiple primary electron beams 20 scans the inside of a sub-irradiation region 29 concerned surrounded by the beam pitch in the x direction and the beam pitch in the y direction where the beam concerned itself is located therein. Each primary electron beam 10 of the multiple primary electron beams 20 is associated with any one of the sub-irradiation regions 29 which are different from each other. At the time of each shot, each primary electron beam 10 is applied to the same position in the associated sub-irradiation region 29 concerned. The primary electron beam 10 is moved in the sub-irradiation region 29 by collective deflection of all the multiple primary electron beams 20 by the sub deflector 209. By repeating this operation, the inside of one sub-irradiation region 29 is irradiated with one primary electron beam 10 in order. Then, when scanning of one sub-irradiation region 29 is completed, the irradiation position is moved to an adjacent rectangular region 33 in the same stripe region 32 by collectively deflecting all the multiple primary electron beams 20 by the main deflector 208. By repeating this operation, the inside of the stripe region 32 is irradiated in order. After completing scanning one stripe region 32, the irradiation position is moved to the next stripe region 32 by moving the stage 105 and/or by collectively deflecting all the multiple primary electron beams 20 by the main deflector 208. As described above, a secondary electron image of each sub-irradiation region 29 is acquired by irradiation with each primary electron beam 10. By combining secondary electron images of respective sub-irradiation regions 29, a secondary electron image of the rectangular region 33, a secondary electron image of the stripe region 32, or a secondary electron image of the chip 332 is configured.

As shown in FIG. 4, each sub-irradiation region 29 is divided into a plurality of rectangular frame regions 30, and a secondary electron image (inspection image) per frame region 30 is used for inspection. In the example of FIG. 4, one sub-irradiation region 29 is divided into four frame regions 30, for example. However, the number used for the dividing is not limited to four, and other number may be used.

It is also preferable to group, for example, a plurality of chips 332 aligned in the x direction as one group, and to divide in the y direction each group into a plurality of stripe regions 32 by a predetermined width, for example. Then, moving between the stripe regions 32 may be performed not only for each chip 332 but also for each group.

In the case of irradiating the substrate 101 with the multiple primary electron beams 20 while continuously moving the stage 105, the main deflector 208 executes a tracking operation by performing collective deflection so that the irradiation position of the multiple primary electron beams 20 may follow the movement of the stage 105. Therefore, the emission position of the multiple secondary electron beams 300 changes every second with respect to the trajectory central axis of the multiple primary electron beams 20. Similarly, when scanning the inside of the sub-irradiation region 29, the emission position of each secondary electron beam changes every second in the sub-irradiation region 29. Thus, the deflector 218 collectively deflects the multiple secondary electron beams 300 so that each secondary electron beam whose emission position has changed as described above may be applied to a corresponding detection region of the multi-detector 222.

When inspecting a detected inspection image, the contour line of each figure pattern is extracted (obtained). However, as described above, since the template and edge filter for use in obtaining the contour line (pattern edges) are conventionally fixed, and layout data is needed to extract the pattern edges, if a profile change occurs due to an image change and the like resulting from noise, charging, focus deviation, and so on, a problem arises in that an error (deviation) is generated at the edge position. Then, a wavelet transform which can reduce the influence of the error due to the image change, and the like is used according to the first embodiment.

Figure 5:
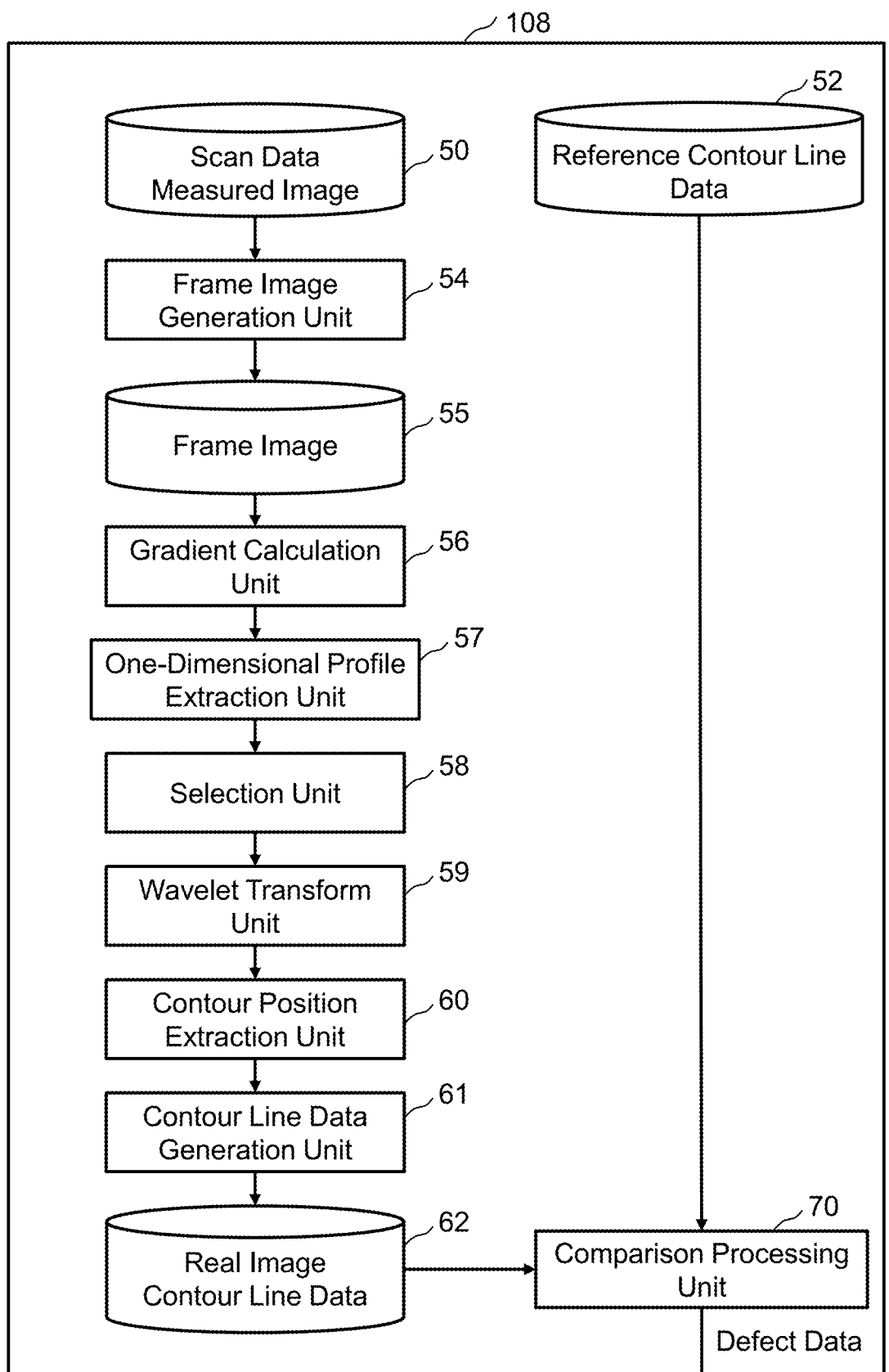
FIG. 5 is a block diagram showing an example of an internal configuration of a comparison circuit according to the first embodiment.

FIG. 5 is a block diagram showing an example of an internal configuration of a comparison circuit according to the first embodiment. In FIG. 5, storage devices 50, 52, 55, and 62 such as magnetic disk drives, a frame image generation unit 54, a gradient calculation unit 56, a one-dimensional profile extraction unit 57, a selection unit 58, a wavelet transform unit 59, a contour position extraction unit 60, a contour line data generation unit 61, and a comparison processing unit 70 are arranged in the comparison circuit 108. Each of the "units" such as the frame image generation unit 54, the gradient calculation unit 56, the one-dimensional profile extraction unit 57, the selection unit 58, the wavelet transform unit 59, the contour position extraction unit 60, the contour line data generation unit 61, and the comparison processing unit 70 includes processing circuitry. As the processing circuitry, for example, an electric circuit, computer, processor, circuit board, quantum circuit, semiconductor device, or the like can be used. Moreover, each of the "units" may use common processing circuitry (the same processing circuitry), or different processing circuitry (separate processing circuitry). Input data needed in the frame image generation unit 54, the gradient calculation unit 56, the one-dimensional profile extraction unit 57, the selection unit 58, the wavelet trans form unit 59, the contour position extraction unit 60, the contour line data generation unit 61, and the comparison processing unit 70, and calculated results are stored in a memory (not shown) or in the memory 118 each time.

Figure 6:
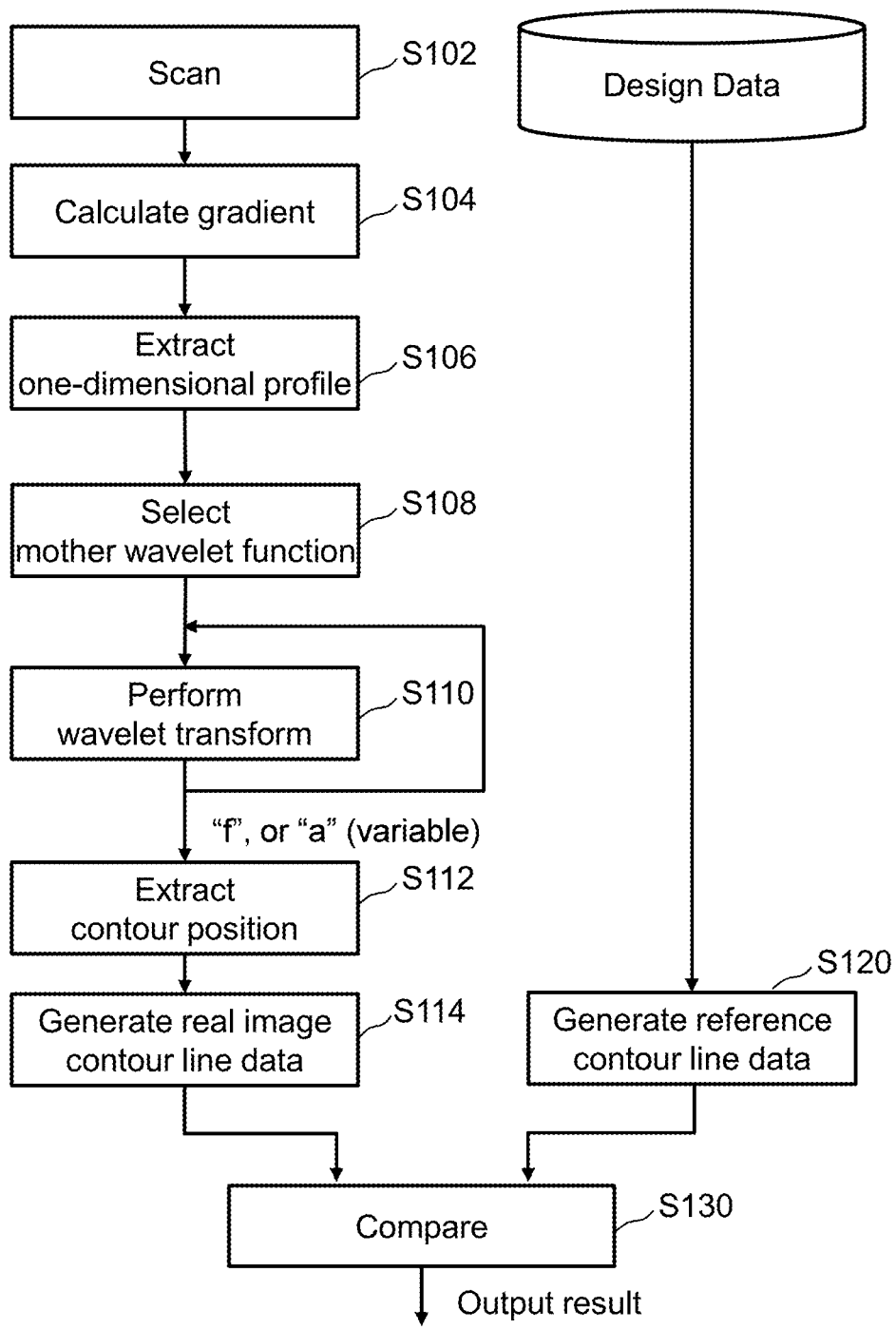
FIG. 6 is a flowchart showing main steps of an inspection method according to the first embodiment.

FIG. 6 is a flowchart showing main steps of an inspection method according to the first embodiment. In FIG. 6, the inspection method of the first embodiment executes a series of steps: a scanning step (S102), a gradient calculation step (S104), a one-dimensional profile extraction step (S106), a mother wavelet function selection step (S108), a wavelet transform step (S110), a contour position extraction step (S112), a real image contour line data generation step (S114), a reference contour line data generation step (S120), and a comparison step (S130).

In the scanning step (S102), using the substrate 101 on which a figure pattern has been formed, the image acquisition mechanism 150 acquires an image of the substrate 101. Specifically, the image acquisition mechanism 150 irradiates the substrate 101, on which a figure pattern has been formed, with the multiple primary electron beams 20 to acquire a secondary electron image of the substrate 101 by detecting the multiple secondary electron beams 300 emitted from the substrate 101 due to the irradiation with the multiple primary electron beams 20. As described above, reflected electrons and secondary electrons may be projected on the multi-detector 222, or alternatively, after reflected electrons having been emitted along the way, only remaining secondary electrons (the multiple secondary electron beams 300) may be projected thereon.

As described above, the multiple secondary electron beams 300 emitted from the substrate 101 by the irradiation with the multiple primary electron beams 20 are detected by the multi-detector 222. Detected data (measured image data: secondary electron image data: inspection image data) on a secondary electron of each pixel in each sub irradiation region 29 detected by the multi-detector 222 is output to the detection circuit 106 in order of measurement. In the detection circuit 106, the detected data in analog form is converted into digital data by an A-D converter (not shown), and stored in the chip pattern memory 123. Then, the acquired measured image data is transmitted to the comparison circuit 108, together with information on each position from the position circuit 107.

The measured image data (beam image) transmitted into the comparison circuit 108 is stored in the storage device 50.

Then, the frame image generation unit 54 generates a frame image 31 of each of a plurality of frame regions 30 obtained by further dividing the image data of the sub-irradiation region 29 acquired by the scanning operation of each primary electron beam 10. In order to prevent missing an image, it is preferable that margin regions overlap each other in each frame region 30. The generated frame image 31 is stored in the storage device 55.

In the gradient calculation step (S104), the gradient calculation unit 56 (differential intensity calculation unit) calculates, for each pixel of the frame image 31, the gradient (differential intensity) of the gray scale value of the pixel concerned.

Figure 7:
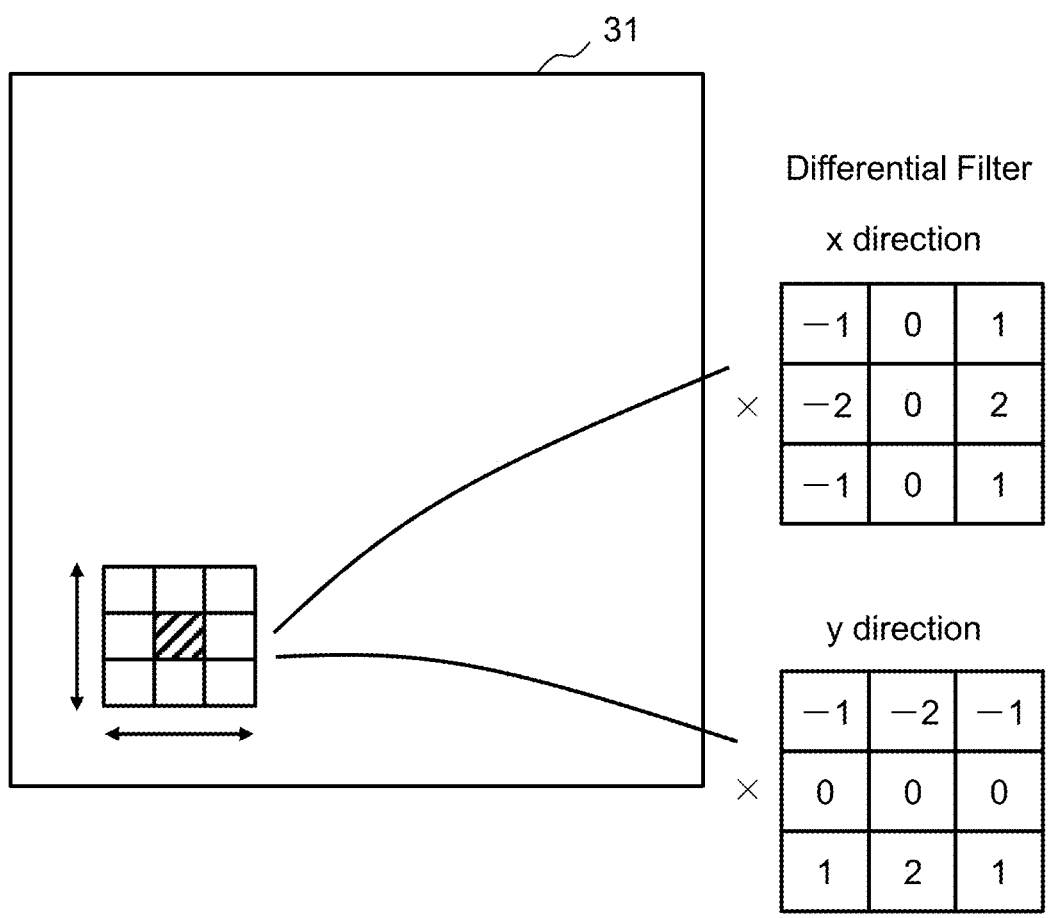
FIG. 7 illustrates calculation of a gradient of the gray scale value of each pixel according to the first embodiment.

FIG. 7 illustrates calculation of a gradient of the gray scale value of each pixel according to the first embodiment. In FIG. 7, the gradient calculation unit 56 convolves a differential filter with a pixel array (e.g., 512×512) of each frame image 31. Specifically, while shifting (changing) the target pixel in order, the gradient calculation unit 56 extracts, for example, a 3×3 pixel array centering on the target pixel, and multiplies the pixel array by the differentiation filter. The pixel array centering on the target pixel is not limited to the pixel array of 3×3, and it may be composed of pixels more than 3×3. As shown in FIG. 7, the differentiation filter is configured by an x direction differentiation filter and a y direction differentiation filter. It is preferable to use, as the differentiation filter, a Sobel filter which can extract a pixel with a large gradient of the gray scale level by performing a differential approximation while reducing noise by levelling in the lateral direction (the x direction) or in the longitudinal direction (the y direction) after giving a weight to the center of the pixel array. In the case of FIG. 7, a differentiation filter of 3×3 is used as an example. However, it is not limited thereto, and it may be composed of pixels more than 3×3. Then, the x direction differential filter and the y direction differential filter are individually convolved with the pixel array of 3×3 centering on the target pixel. Thereby, the value of the gradient in the x direction and the value of the gradient in the y direction can be calculated. The gradient calculation unit 56 obtains the size (value) of the gradient by calculating a square root of the gradient in the x direction and the gradient in the y direction.

In the one-dimensional profile extraction step (S106), the one-dimensional profile extraction unit 57 extracts a plurality of one-dimensional profiles for a plurality of pixels with a gradient size (differential intensity value) greater than or equal to a threshold value in the image, each of the one-dimensional profiles being extracted for each pixel of the plurality of pixels and being a one-dimensional profile of a plurality of pixels including a pixel with the gradient size greater than or equal to the threshold value in the direction of the normal line to the gradient of the pixel with the gradient size.

Figure 8A:
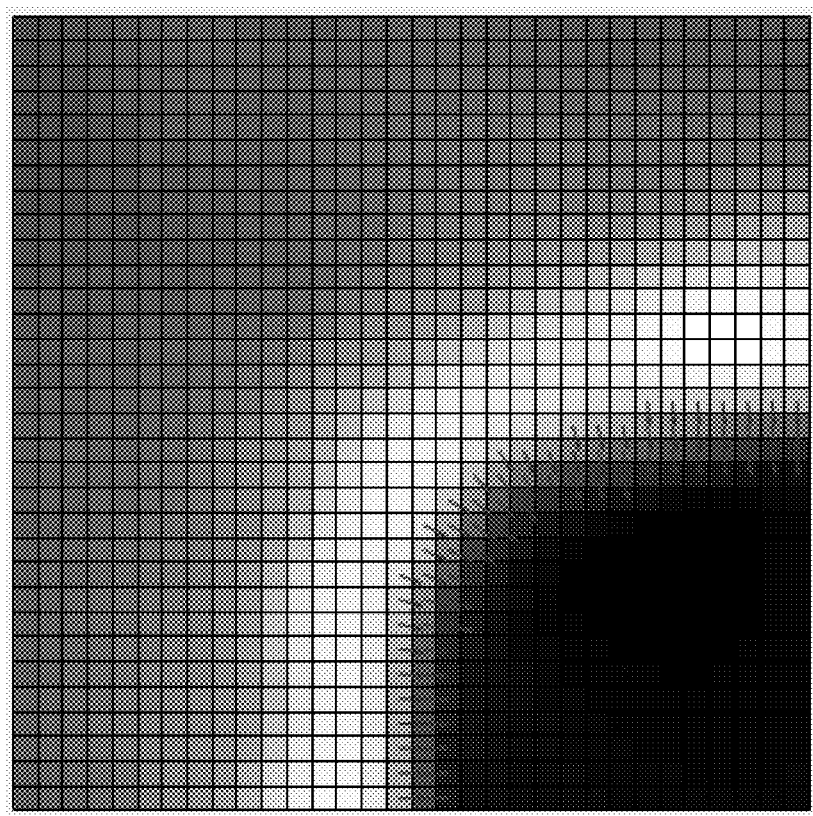
FIGS. 8A and 8B show an example of a figure pattern and a gradient vector according to the first embodiment.
Figure 8B:
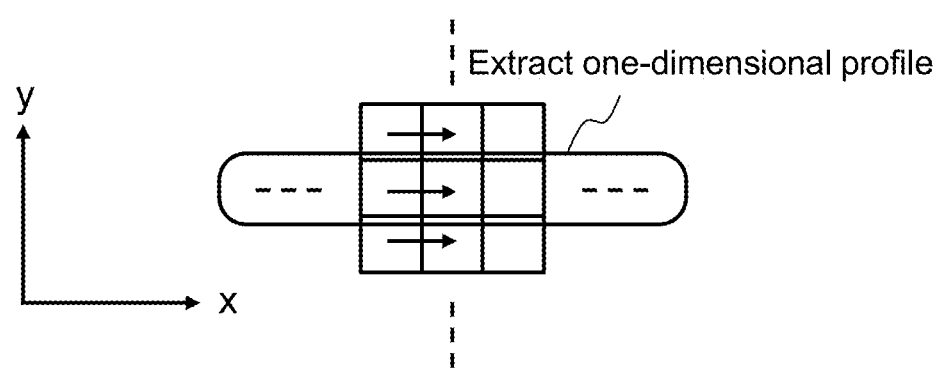

FIGS. 8A and 8B show an example of a figure pattern and a gradient vector according to the first embodiment. FIG. 8A shows an example of gradient vectors of a plurality of pixels each with a gradient value greater than or equal to a threshold value, at the upper left corner of a rectangular pattern. For example, for a pixel on the side line in the y direction of the figure, a gradient vector of a predetermined size in the x direction (or −x direction) can be obtained. For example, for a pixel on the side line in the x direction of the figure, a gradient vector of a predetermined size in the y direction (or −y direction) can be obtained. For example, for a pixel on the side line not in the x direction nor the y direction, such as at the corner of the figure, a gradient vector of a predetermined size in a combined direction of the x and y directions can be obtained. Here, the vector of the gradient vector indicates the direction of the normal line to the gradient of the pixel concerned. The normal line direction corresponds to the direction orthogonal to an iso-gradient value line (iso-differential intensity line). In an actual calculation, assuming that the gradient in the x direction is a gradient vector in the x direction and the gradient in the y direction is a gradient vector in the y direction, the normal line direction corresponds to the direction obtained by combining (adding) the gradient vector in the x direction and the gradient vector in the y direction. Although, in the example of FIG. 8A, the gradient vectors of a plurality of pixels each with a gradient value greater than or equal to a threshold value are extracted and shown, it goes without saying that gradient vectors may also individually exist for other pixels. For each frame image 31, the one-dimensional profile extraction unit 57 extracts pixels, each with a gradient value greater than or equal to a threshold value, from gradient vectors of pixels in the frame image 31 concerned. Then, for each extracted pixel, the one-dimensional profile extraction unit 57 extracts a one-dimensional profile in the direction of the normal line to the gradient of the pixel concerned. The example of FIG. 8B shows a partial enlarged portion of a pixel which is guessed to be on the left edge (edge in the y direction) of the rectangular pattern shown in FIG. 8A. In the case of FIG. 8B, since the gradient vectors are in the x direction, extracted is a one-dimensional profile based on gray scale values of one-dimensional pixels in the x direction which include the pixel concerned such as including it at the center. The example of FIG. 8B shows vectors in the x direction with respect to three pixels aligned in the y direction. Further, in most cases, pixels each with a gradient value greater than or equal to a threshold adjacently also exist in the x direction. In that case, one-dimensional profiles are extracted with respect also to such pixels.

Figure 9:
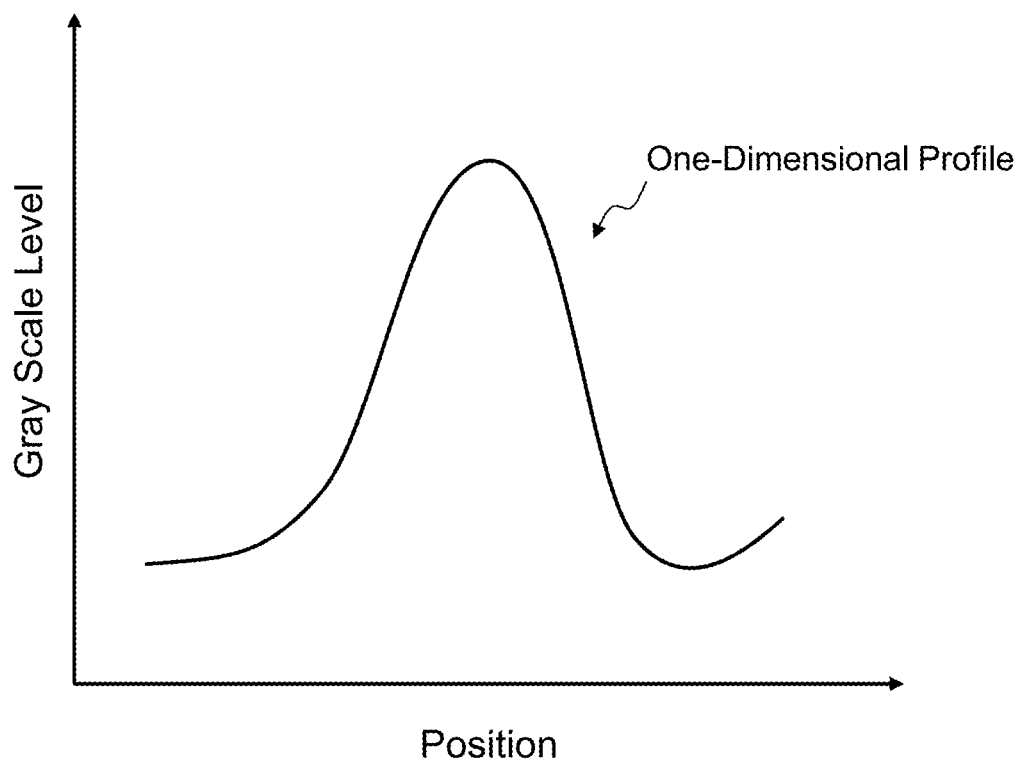
FIG. 9 is a graph showing an example of a one-dimensional profile according to the first embodiment.
Figure 10A:
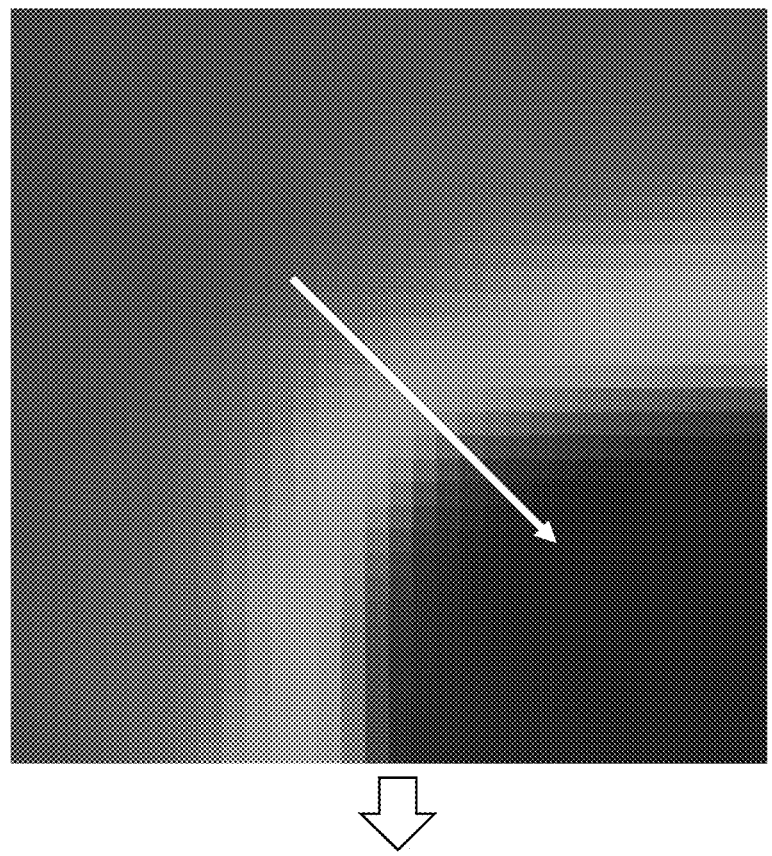
FIGS. 10A and 10B show examples of a method for sampling a one-dimensional profile according to the first embodiment.
Figure 10A:
Figure 10B:
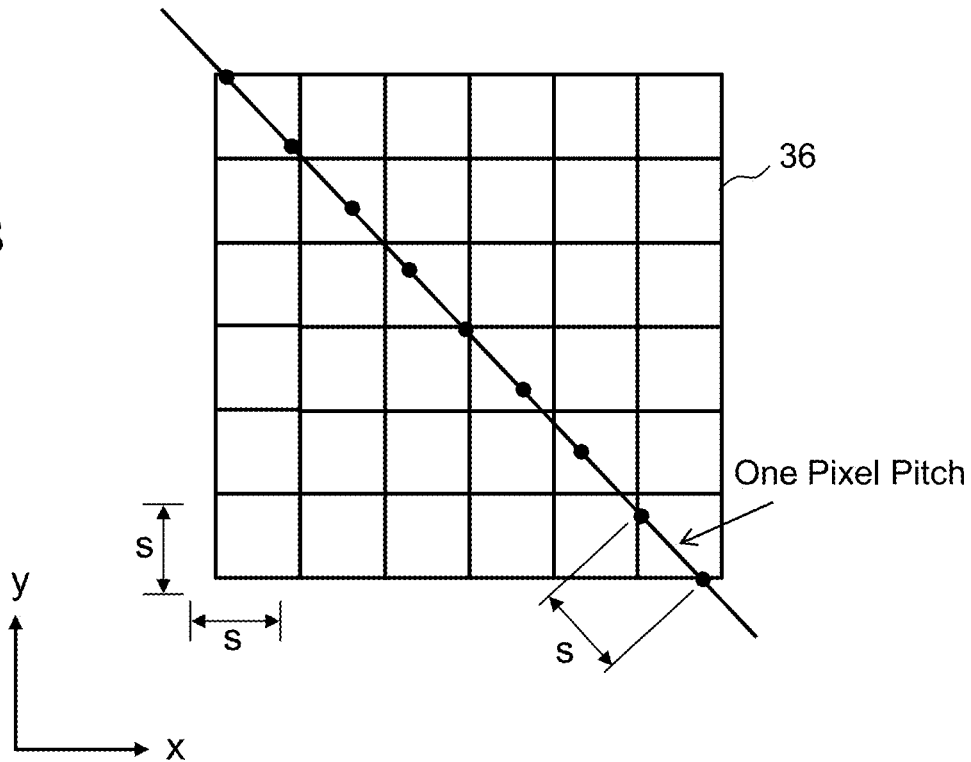

FIG. 9 is a graph showing an example of a one-dimensional profile according to the first embodiment. In FIG. 9, the ordinate axis represents a gray scale value, and the abscissa axis represents a position. As shown in FIG. 9, with respect to a secondary electron image, a peak appears at the edge portion of a figure pattern in many cases. In the case of each pixel being defined by a square, when extracting a one-dimensional profile in the x direction or in the y direction, each gray scale value may be plotted treating a pixel size as a pitch. However, for example, when extracting a one-dimensional profile neither in the x direction nor in the y direction, the arrangement pitch of pixels does not accord with the pixel size. Then, adjustment is made as follows:

FIGS. 10A and 10B show examples of a method for sampling a one-dimensional profile according to the first embodiment. FIG. 10A shows an example of extracting a one-dimensional profile in the direction of the normal line of a pixel at the position guessed to be on the contour line of the upper left corner of a rectangular pattern. In the case of FIG. 10A, since the normal line direction is not in the x direction nor in the y direction, the position to be plotted is interpolated for extracting a one-dimensional profile. Specifically, as shown in FIG. 10B, the gray scale value is plotted in the normal line direction treating a pixel size "s" as a pitch. For example, defining that the gray scale value of a pixel is at the center of the pixel concerned, the gray scale value at each plot position can be defined by performing interpolation processing.

In the mother wavelet function selection step (S108), the selection unit 58 selects at least one mother wavelet function from a plurality of mother wavelet functions prepared beforehand.

Figure 11:
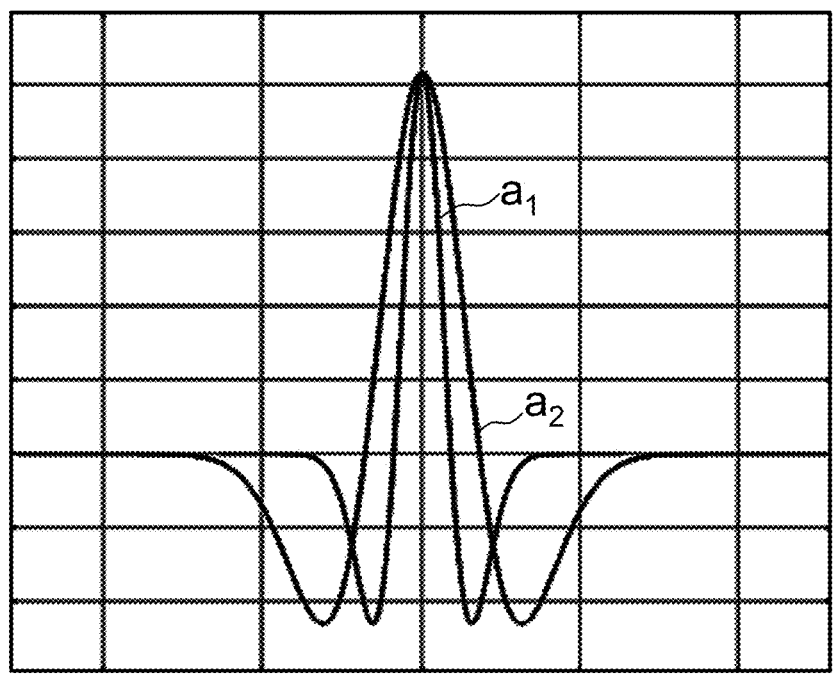
FIG. 11 shows an example of a wavelet transform equation according to the first embodiment.

FIG. 11 shows an example of a wavelet transform equation according to the first embodiment. The example of FIG. 11 shows a wavelet transform function w(a, b) defined by the equation (1) described below using a coefficient "k", a scale variable "a", a coordinate variable "b", a mother wavelet (localized wave) function "f", and a gray scale value "d(x)". "x" indicates the position of a one-dimensional profile. Although the sign of the complex conjugate is applied to the mother wavelet function "f" in the equation (1), it is acceptable to ignore the sign in a real function.

$$w(a, b) = k \int_{-\infty}^{\infty} d(x) \bar{f}\left(\frac{x-b}{a}\right) dx \qquad (1)$$

The example of FIG. 11 shows that the waveform of after the wavelet transform changes due to changing the scale variable "a". FIG. 11 shows the waveforms in the case of changing the scale variable "a" to "a1" and "a2". Although the waveforms symmetrical to the central axis are shown as wavelets in the example of FIG. 11, the kind of the waveform of the mother wavelet function "f" is not limited to one. Since the mother wavelet function is a function of finite length, in the case of discrete data such as image data, the equation (1) can be regarded as a kind of a finite impulse response (FIR) filter.

Figure 12:
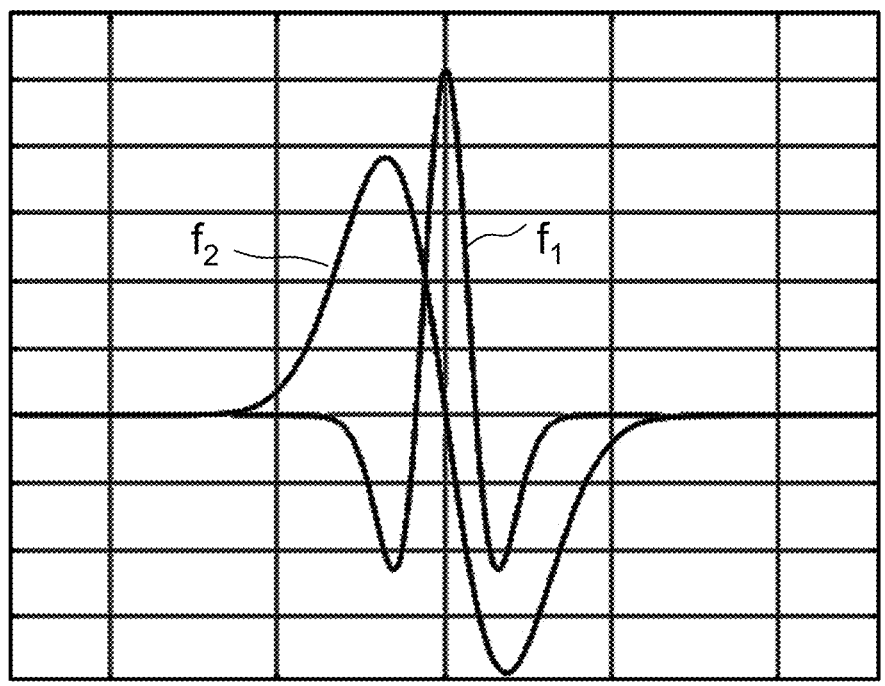
FIG. 12 shows another example of a wavelet transform equation according to the first embodiment.

FIG. 12 shows another example of a wavelet transform equation according to the first embodiment. The example of FIG. 12 shows a wavelet transform function w(a, b) defined by the equation (2) described below using a coefficient "k", a coordinate variable "b", a mother wavelet function "fa", and a gray scale value "d(x)". "x" indicates the position of a one-dimensional profile. Although the sign of the complex conjugate is applied to the mother wavelet function "fa" in the equation (2), it is acceptable to ignore the sign in a real function.

$$w(a,b) = k \int_{-\infty}^{\infty} d(x) \bar{f}_a(x-b) dx \qquad (2)$$

The example of FIG. 12 shows a wavelet transform function w(a, b) in the case of using a plurality of mother wavelet functions "fa". In FIG. 12, the mother wavelet function "fa" is shown as waveforms of two kinds, "f1" and "f2". In the case of FIG. 12, an even function and an odd function are shown as examples of the mother wavelet function. A plurality of mother wavelet functions "fa" are not limited to mother wavelet functions having different kinds of waveforms. Even when the waveforms are of the same kind, if the scale variable "a" has been changed, it is acceptable that such a case is treated as a different mother wavelet function being one of a plurality of mother wavelet functions "fa".

The waveform of the optimal mother wavelet function in which the waveform peak position change after the wavelet transform is small even when an image change, etc. occurs may be different depending on the line width of a figure pattern. Therefore, preferably, for each line width of a figure pattern, the waveform of the suitable mother wavelet function is obtained in advance by experiments, etc. In that case, the selection unit 58 selects, in accordance with the line width of the pattern, at least one of a plurality of mother wavelet functions, using design data being the basis of the figure pattern formed on the substrate 101. Further, it is also preferable to select all the mother wavelet functions prepared beforehand. Alternatively, one mother wavelet function may be selected regardless of the line width of the figure pattern.

In the wavelet transform step (S110), the wavelet transform unit 59 performs a wavelet transform on a one-dimensional profile, using at least one selected mother wavelet function. For example, when there is one selected mother wavelet function, the wavelet transform unit 59 performs, on each one-dimensional profile, a wavelet transform while changing the scale variable "a" of the mother wavelet function "f". Specifically, while changing the scale variable "a", the wavelet transform unit 59 obtains the wavelet transform function w(a, b) by solving the equation (1) described above. Alternatively, for example, when there are two or more selected mother wavelet functions "f" and when the case of the scale variable "a" having changed is not included as another mother wavelet function in a plurality of mother wavelet functions "fa", the wavelet transform unit 59 performs, on each one-dimensional profile, a wavelet transform while changing the scale variable "a" of each mother wavelet function "f". Alternatively, for example, when there are two or more selected mother wavelet functions "fa" and when the case of the scale variable "a" having changed is included as another mother wavelet function in a plurality of mother wavelet functions "fa", the wavelet transform unit 59 performs, on each one-dimensional profile, a wavelet transform by using a plurality of mother wavelet functions "fa". Specifically, the wavelet transform unit 59 obtains the wavelet transform function w(a, b) by solving the equation (2) described above.

In the contour position extraction step (S112), for each one-dimensional profile, the contour position extraction unit 60 extracts the maximum (highest) peak position, as a contour position of the figure pattern, from the peak positions of transformed profiles (waveforms) of after the wavelet transform in which the scale variable "a" is variably set. When a plurality of mother wavelet functions "fa" are selected, the contour position extraction unit 60 extracts, for each one-dimensional profile, the maximum (highest) peak position, as a contour position of the figure pattern, from the peak positions of transformed profiles (waveforms) of after wavelet transforms using a plurality of mother wavelet functions "fa". The peak position is extracted per sub-pixel. Each of the plurality of mother wavelet functions is used for wavelet transform of a different one of the transformed profiles.

Figure 13:
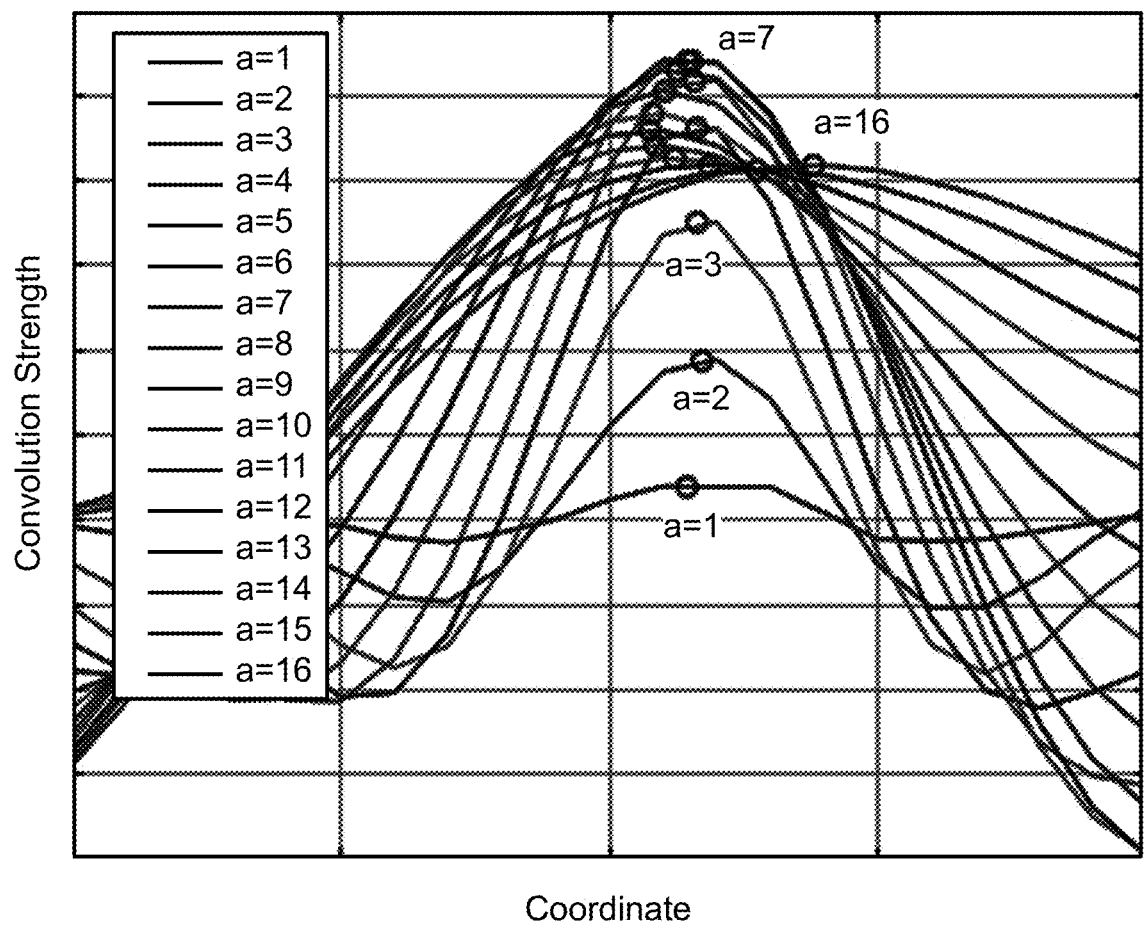
FIG. 13 shows examples of waveforms of after a wavelet transform in which the scale variable is variably set according to the first embodiment.

FIG. 13 shows examples of waveforms of after a wavelet transform in which the scale variable is variably set according to the first embodiment. In FIG. 13, the ordinate axis represents a convolution strength (wavelet transform intensity), and the abscissa axis represents a coordinate variable "b" (position). The position is along the direction (normal line direction) of a one-dimensional profile. FIG. 13 shows the results of wavelet transforms performed while changing the scale variable "a" from 1 to 16 using the equation (1), with respect to a one-dimensional profile based on one of a plurality of pixels each with a gradient value greater than or equal to a predetermined threshold value in the frame image 31. FIG. 13 shows the graphs relating to the scale variable "a" being a=1, 2, 3, 7, and 16 in the case of a=1 to 16. As shown in the example of FIG. 13, it turns out that the peak position and peak intensity of the waveform of after a wavelet transform changes due to variably changing the scale variable "a". The contour position extraction unit 60 extracts the maximum (highest) peak position, as a contour position of the figure pattern, from the peak positions of profiles of after the wavelet transform. FIG. 13 shows the case of the peak becoming the maximum (highest) when the scale variable "a" is 7. Therefore, the contour position extraction unit 60 extracts, per sub-pixel, the peak position of the waveform of the case where the scale variable "a" is 7.

Figure 14:
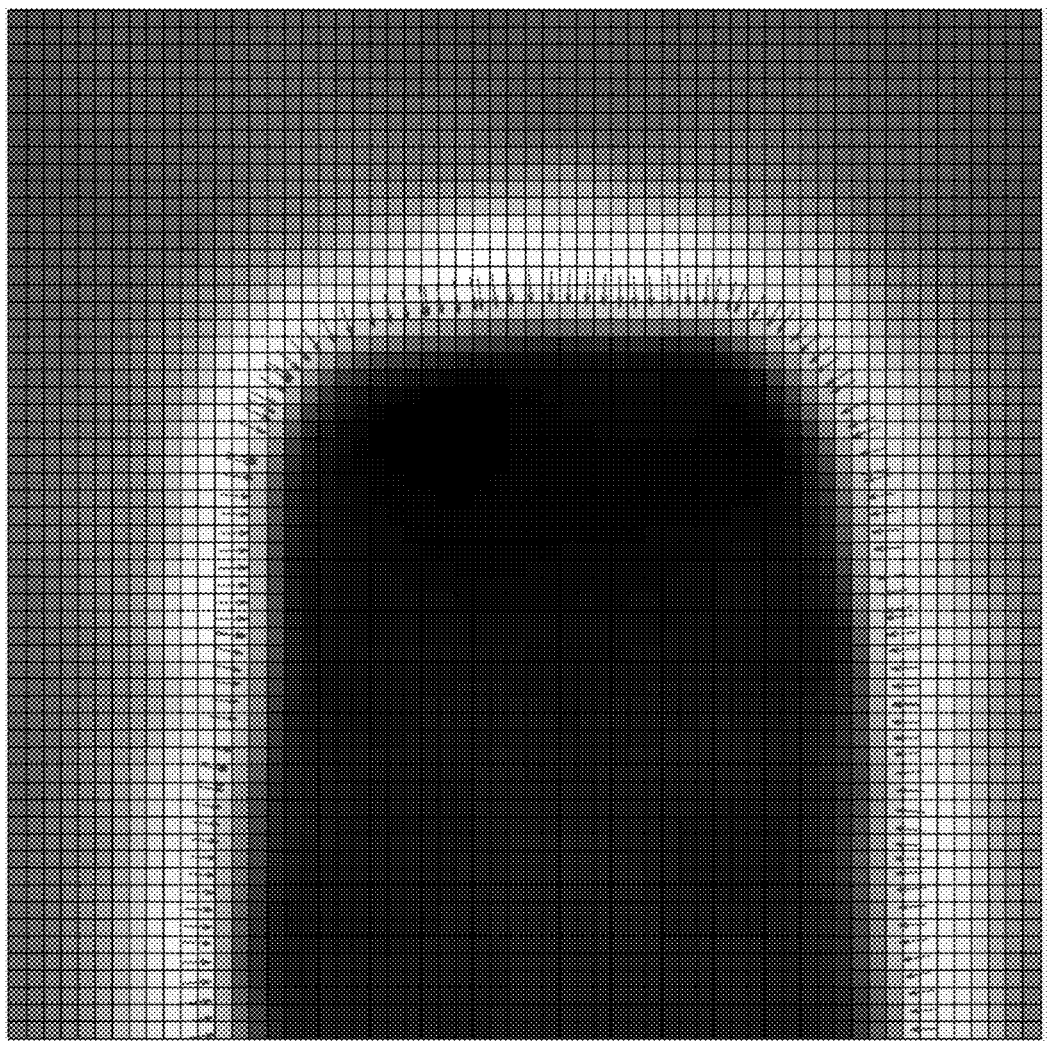
FIG. 14 shows an example of a peak position calculation result according to the first embodiment.

FIG. 14 shows an example of a peak position calculation result according to the first embodiment. The example of FIG. 14 shows the upper part of a rectangular pattern. In FIG. 14, the arrow tip indicates the peak position. It turns out that the peak position is located on the contour line of the figure pattern as shown in FIG. 14.

In the real image contour line data generation step (S114), the contour line data generation unit 61 generates contour line data of the figure pattern in the frame image 31 made by connecting a plurality of extracted contour positions. A plurality of extracted contour positions are along pixels which are adjacent to each other. However, in that case, one pixel or about two pixels may be missed (omitted) due to an image change, and the like. The contour line data generation unit 61 generates contour line data of a figure pattern by connecting a plurality of adjacent contour positions.

Figure 15:
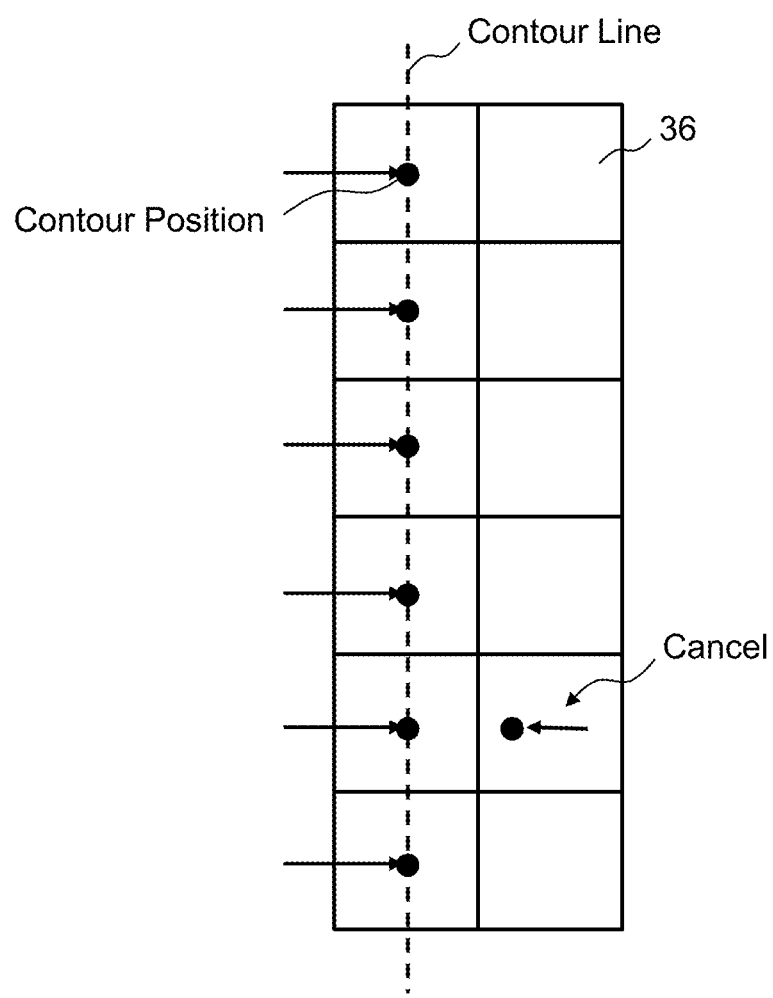
FIG. 15 shows an example of a plurality of extracted contour positions according to the first embodiment.

FIG. 15 shows an example of a plurality of extracted contour positions according to the first embodiment. FIG. 15 shows an example of a plurality of contour positions each extracted for each pixel arranged in the y direction. In that case, if the peak position shifts, that position may exist doubly during connecting a plurality of adjacent contour positions. For example, when connecting a plurality of contour positions, it may happen that exist two peak position candidates calculated from two pixels whose arrangement directions are orthogonal to each other. Then, when contour positions doubly exist in connecting extracted contour positions, the contour line data generation unit 61 excludes the contour position of a pixel whose gradient direction is opposite to that of forward and backward adjacent contour positions from a plurality of contour positions forming the contour line of the figure pattern in the frame image 31. In that case, it is preferable to exclude the contour position whose peak intensity is smaller than that of the other one or whose gradient value (differential intensity) is smaller than that of the other one. When the contour line data generation unit 61 excludes the contour position of a pixel, it is not limited to the contour position of a pixel with a gradient direction completely opposite to that of forward and backward adjacent contour positions. That is, a contour position candidate whose gradient direction is around 180° to that of forward and backward adjacent contour positions may be excluded. Further, as another case where the peak position doubly exists because of shifting, two peak position candidates whose gradient direction difference is around 0° (the same direction) may exist. In such a case, the contour position of a pixel whose peak intensity described above is smaller than that of the other one or whose gradient value (differential intensity) is smaller than that of the other one is excluded from a plurality of contour positions forming the contour line of the figure pattern in the frame image 31. Contour line data of the generated frame image 31 (real image) is stored in the storage device 62.

In the reference contour line data generation step (S120), the reference contour line data generation circuit 112 generates reference contour line data of the figure pattern in the region corresponding to the frame image 31. In other words, the reference contour line data generation circuit 112 generates, for each frame region 30, the contour line of a figure pattern in the frame region 30 concerned as a reference contour line. Specifically, it operates as follows: First, the reference contour line data generation circuit 112 reads design pattern data from the storage device 109 through the control computer 110. Basics of figures defined by the design pattern data are, for example, rectangles and triangles. For example, there is stored figure data defining the shape, size, position, and the like of each pattern figure by using information, such as coordinates (x, y) of the reference position of the figure, lengths of sides of the figure, and a figure code serving as an identifier for identifying the figure type such as a rectangle, a triangle and the like. The reference contour line data generation circuit 112 generates contour line data (reference contour line data) of each figure pattern using the design pattern data. The generated reference contour line data is output to the comparison circuit 108, and stored in the storage device 52 in the comparison circuit 108.

Although the case of generating reference contour line data from the design data is described in the above example, it is not limited thereto. It is also preferable to generate, for each frame region 30, a reference image by using the design data composed of vector data, and extract, from the reference image, reference contour line data on each figure pattern in the image. In that case, preferably, the extraction direction is based on the same method as that for extracting the frame image 31.

In the comparison step (S130), the comparison processing unit 70 (comparison unit) compares the contour line of the figure pattern in the frame image 31 made by connecting a plurality of extracted contour positions with the reference contour line of the frame region 30 corresponding to the frame image 31 concerned. Specifically, for each frame image 31 and for each figure pattern, the comparison processing unit 70 calculates the distance between the contour line (real image contour line) of a figure pattern in the frame image 31 and the reference contour corresponding to the figure pattern.

Figure 16:
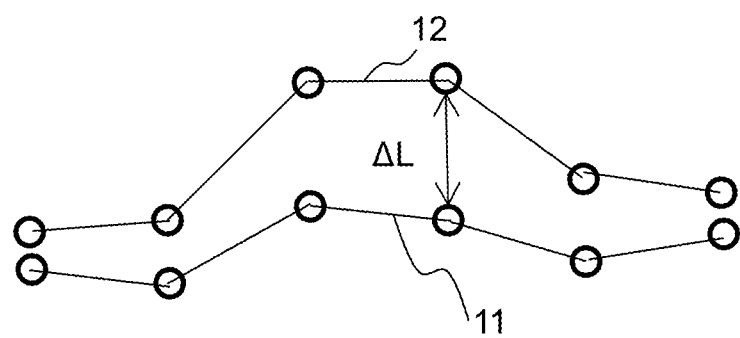
FIG. 16 illustrates a comparison method according to the first embodiment.

FIG. 16 illustrates a comparison method according to the first embodiment. FIG. 16 shows a part of a contour line 11 of a real image (frame image 31) and a corresponding reference contour line 12. A distance ΔL between the position of the contour line 11 and the reference contour line 12 corresponding to the position is measured at all the positions of the contour line 11, and measurement results are output as reaction values. Preferably, the reaction values are output as image data in which the reaction values are treated as gray scale values, or as a list of position coordinates and reaction values. When a reaction value at a position is larger than a determination threshold, the coordinate of the position is determined to be a defective part. Comparison results are output to the storage device 109, the monitor 117, or the memory 118.

In the examples described above, the die-to-database inspection is performed. However, it is not limited thereto. An image may also be inspected based on the method for die-to-die inspection. Now, the case of performing the die-to-die inspection will be described.

The frame image on the die 2, on which there is formed the same pattern as that of the frame image of the die 1 to be inspected, is used as a reference image, and contour positions of the frame images of the dies 1 and 2 are extracted so as to generate contour line data. Then, comparison processing similar to that of the die-to-database inspection is performed.

As described above, according to the first embodiment, it is possible to reduce an error (deviation) at an edge position detected from an image even when a profile change occurs due to an image change and the like. For example, an error at a detected pattern edge position can be reduced even if there is an image profile change due to an image change resulting from noise, charging, and/or focus deviation, or due to dependency on the figure size.

In the above description, each " . . . circuit" includes processing circuitry. As the processing circuitry, for example, an electric circuit, computer, processor, circuit board, quantum circuit, semiconductor device, or the like can be used. Each " . . . circuit" may use common processing circuitry (the same processing circuitry), or different processing circuitry (separate processing circuitry). A program for causing a computer to execute processing or the like may be stored in a recording medium, such as a magnetic disk drive, flash memory, and the like. For example, the position circuit 107, the comparison circuit 108, the reference image generation circuit 112, the stage control circuit 114, the lens control circuit 124, the blanking control circuit 126, and the deflection control circuit 128 may be configured by at least one processing circuit described above.

Embodiments have been explained referring to specific examples described above. However, the present invention is not limited to these specific examples. Although FIG. 1 describes the case where the multiple primary electron beams 20 are formed by the shaping aperture array substrate 203 irradiated with one beam from the electron gun 201 serving as an irradiation source, it is not limited thereto. The multiple primary electron beams 20 may be formed by individual irradiation with primary electron beams from a plurality of irradiation sources.

It is also preferable to similarly extract a contour position by performing the wavelet transform described above when extracting the contour line of a figure pattern in an optical image obtained by irradiation with lights, such as ultraviolet rays.

While the apparatus configuration, control method, and the like not directly necessary for explaining the present invention are not described, some or all of them can be appropriately selected and used on a case-by-case basis when needed.

In addition, any other pattern inspection apparatus and pattern inspection method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
an image acquisition mechanism configured to acquire an image of a substrate on which a figure pattern has been formed;
a differential intensity calculation circuit configured to calculate, for each pixel of the image, a differential intensity of a gray scale value of the each pixel;
a profile extraction circuit configured to extract a plurality of predetermined dimensional profiles for a plurality of pixels with a value of the differential intensity greater than or equal to a threshold value in the image, each of the plurality of predetermined dimensional profiles being extracted for each pixel of the plurality of pixels and being a predetermined dimensional profile of a plurality of pixels including a pixel with the value of the differential intensity greater than or equal to the threshold value in a predetermined direction with respect to the differential intensity of the pixel with the value of the differential intensity;
a wavelet transform circuit configured to perform, on each of the plurality of predetermined dimensional profiles, a wavelet transform while changing a scale variable of a mother wavelet function to a predetermined value;
a contour position extraction circuit configured to extract, for the each of the plurality of predetermined dimensional profiles, a maximum peak position as a contour position of the figure pattern from peak positions of a plurality of transformed profiles of after the wavelet transform in which the scale variable is set; and
a comparison circuit configured to compare a contour line of the figure pattern of the image made by connecting a plurality of extracted contour positions with a reference contour line of a figure pattern in a region corresponding to the image.

2. The apparatus according to claim 1, wherein, in a case in which the contour position doubly exists in connecting the plurality of extracted contour positions, a contour position of a pixel whose gradient direction of a gray scale value is opposite to that of forward and backward adjacent contour positions is excluded from the plurality of extracted contour positions forming the contour line of the figure pattern of the image.

3. The apparatus according to claim 1, further comprising:
a selection circuit configured to select, in accordance with a pattern line width, at least one of a plurality of mother wavelet functions, using design data being a basis of the figure pattern formed on the substrate, wherein
the wavelet transform circuit performs the wavelet transform on the each of the plurality of predetermined dimensional profiles, using the at least one selected from the plurality of mother wavelet functions.

4. A pattern inspection apparatus comprising:
an image acquisition mechanism configured to acquire an image of a substrate on which a figure pattern has been formed;
a differential intensity calculation circuit configured to calculate, for each pixel of the image, a differential intensity of a gray scale value of the each pixel;
a profile extraction circuit configured to extract a plurality of predetermined dimensional profiles for a plurality of pixels with a value of the differential intensity greater than or equal to a threshold value in the image, each of the plurality of predetermined dimensional profiles being extracted for each pixel of the plurality of pixels and being a predetermined dimensional profile of a plurality of pixels including a pixel with the value of the differential intensity greater than or equal to the threshold value in a predetermined direction with respect to the differential intensity of the pixel with the value of the differential intensity;
a wavelet transform circuit configured to perform, on each of the plurality of predetermined dimensional profiles, a wavelet transform using a plurality of mother wavelet functions;
a contour position extraction circuit configured to extract, for the each of the plurality of predetermined dimensional profiles, a maximum peak position as a contour position of the figure pattern from peak positions of a plurality of transformed profiles of after the wavelet transform using the plurality of mother wavelet functions, each of the plurality of mother wavelet functions being used for a wavelet transform of a different one of the plurality of transformed profiles; and
a comparison circuit configured to compare a contour line of the figure pattern of the image made by connecting a plurality of extracted contour positions with a reference contour line of a figure pattern in a region corresponding to the image.

5. The apparatus according to claim 4, wherein, in a case in which the contour position doubly exists in connecting the plurality of extracted contour positions, a contour position of a pixel whose gradient direction of a gray scale value is opposite to that of forward and backward adjacent contour positions is excluded from the plurality of extracted contour positions forming the contour line of the figure pattern of the image.

6. The apparatus according to claim 4, further comprising:
a selection circuit configured to select, in accordance with a pattern line width, at least one of a plurality of mother wavelet functions, using design data being a basis of the figure pattern formed on the substrate, wherein
the wavelet transform circuit performs the wavelet transform on the each of the plurality of predetermined dimensional profiles, using the at least one selected from the plurality of mother wavelet functions.

7. A pattern inspection method comprising:
acquiring an image of a substrate on which a figure pattern has been formed;
calculating, for each pixel of the image, a differential intensity of a gray scale value of the each pixel;
extracting a plurality of predetermined dimensional profiles for a plurality of pixels with a value of the differential intensity greater than or equal to a threshold value in the image, each of the plurality of predetermined dimensional profiles being extracted for each pixel of the plurality of pixels and being a predetermined dimensional profile of a plurality of pixels including a pixel with the value of the differential intensity greater than or equal to the threshold value in a predetermined direction with respect to the differential intensity of the pixel with the value of the differential intensity;
performing, on each of the plurality of predetermined dimensional profiles, a wavelet transform while changing a scale variable of a mother wavelet function to a predetermined value;
extracting, for the each of the plurality of predetermined dimensional profiles, a maximum peak position as a contour position of the figure pattern from peak positions of the plurality of transformed profiles of after the wavelet transform in which the scale variable is set; and
comparing a contour line of the figure pattern of the image made by connecting a plurality of extracted contour positions with a reference contour line of a figure pattern in a region corresponding to the image, and outputting a comparison result.

8. The method according to claim 7, wherein, in a case in which the contour position doubly exists in connecting the plurality of extracted contour positions, a contour position of a pixel whose gradient direction of a gray scale value is opposite to that of forward and backward adjacent contour positions is excluded from the plurality of extracted contour positions forming the contour line of the figure pattern of the image.

9. The method according to claim 7, further comprising:
selecting, in accordance with a pattern line width, at least one of a plurality of mother wavelet functions, using design data being a basis of the figure pattern formed on the substrate, wherein the wavelet transform is performed on the each of the plurality of predetermined dimensional profiles, using the at least one selected from the plurality of mother wavelet functions.

10. A pattern inspection method comprising:
acquiring an image of a substrate on which a figure pattern has been formed;
calculating, for each pixel of the image, a differential intensity of a gray scale value of the each pixel;
extracting a plurality of predetermined dimensional profiles for a plurality of pixels with a value of the differential intensity greater than or equal to a threshold value in the image, each of the plurality of predetermined dimensional profiles being extracted for each pixel of the plurality of pixels and being a predetermined dimensional profile of a plurality of pixels including a pixel with the value of the differential intensity greater than or equal to the threshold value in a predetermined direction with respect to the differential intensity of the pixel with the value of the differential intensity;
performing, on each of the plurality of predetermined dimensional profiles, a wavelet transform using a plurality of mother wavelet functions;

extracting, for the each of the plurality of predetermined dimensional profiles, a maximum peak position as a contour position of the figure pattern from peak positions of the plurality of transformed profiles of after the wavelet transform using the plurality of mother wavelet functions, each of the plurality of mother wavelet functions being used for a wavelet transform of a different one of the plurality of transformed profiles; and comparing a contour line of the figure pattern of the image made by connecting a plurality of extracted contour positions with a reference contour line of a figure pattern in a region corresponding to the image, and outputting a comparison result.

11. The method according to claim 10, wherein, in a case in which the contour position doubly exists in connecting the plurality of extracted contour positions, a contour position of a pixel whose gradient direction of a gray scale value is opposite to that of forward and backward adjacent contour positions is excluded from the plurality of extracted contour positions forming the contour line of the figure pattern of the image.

12. The method according to claim 10, further comprising:

selecting, in accordance with a pattern line width, at least one of a plurality of mother wavelet functions, using design data being a basis of the figure pattern formed on the substrate, wherein the wavelet transform is performed on the each of the plurality of predetermined dimensional profiles, using the at least one selected from the plurality of mother wavelet functions.

* * * * *